(12) United States Patent
Tanaka

(10) Patent No.: US 8,744,075 B2
(45) Date of Patent: Jun. 3, 2014

(54) QUANTUM PUBLIC KEY ENCRYPTION SYSTEM

(75) Inventor: Yu Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 595 days.

(21) Appl. No.: 12/965,342

(22) Filed: Dec. 10, 2010

(65) Prior Publication Data
US 2011/0142242 A1 Jun. 16, 2011

(30) Foreign Application Priority Data
Dec. 16, 2009 (JP) ................................. 2009-285698

(51) Int. Cl.
*H04L 9/30* (2006.01)
*H04L 9/08* (2006.01)
*H04L 29/06* (2006.01)
*H04L 9/32* (2006.01)

(52) U.S. Cl.
CPC .............. *H04L 9/0852* (2013.01); *H04L 9/321* (2013.01); *H04L 63/0442* (2013.01); *H04L 63/0823* (2013.01)
USPC .............. 380/30; 713/155; 713/175; 380/278

(58) Field of Classification Search
CPC ......... H04L 9/006; H04L 9/30; H04L 9/0825; H04L 9/083; H04L 9/0827; H04L 9/0852; H04L 9/321; H04L 9/3215; H04L 63/061; H04L 63/0823; H04L 9/0819; H04L 9/3263; H04L 63/06; H04L 63/062; H04L 63/0428; H04L 63/0442
USPC ............. 380/255, 277–279, 282–285, 44, 28, 380/30; 713/150–151, 155–156, 168, 171; 709/218, 249
See application file for complete search history.

(56) References Cited

U.S. PATENT DOCUMENTS 5,307,410 A * 4/1994 Bennett ......................... 380/256
5,515,438 A * 5/1996 Bennett et al. ................ 380/278
(Continued)

FOREIGN PATENT DOCUMENTS

JP 3615132 11/2004
JP 3615133 11/2004
(Continued)

OTHER PUBLICATIONS

Yang et al. "Multiparty simultaneous quantum identity authentication with secret sharing" [Online], Mar. 2008 [Retrieved on Mar. 20, 2013], Science in China Series G: Physics, Mechanics & Astronomy, vol. 51, Issue 3, pp. 321-327, [Retrieved from: http://download.springer.com/static/pdf/219/art%253A10.1007%252Fs11433-008-0034-5.pdf?auth66=1365344743_3a2b41cc675c008c2fe4999d7af1c54d&ext=.pdf].*

(Continued)

*Primary Examiner* — Zachary A Davis
*Assistant Examiner* — Eric W Shepperd
(74) *Attorney, Agent, or Firm* — Oblon, Spivak, McClelland, Maier & Neustadt, L.L.P.

(57) ABSTRACT

Provided is a key generation apparatus that generates, based on a generated random number, quantum gates $U_i$, L and R corresponding respectively to m types of unitary operations $U_i$ corresponding to n qubits and two types of unitary operations L and R corresponding to m qubits, generates a quantum gate CU whose control is enabled such that operation of the quantum gate $U_i$ is controlled according to an input state of the m qubits, generates a quantum gate G by adding the quantum gates L and R to the quantum gate CU, generates a public key P by obfuscating the quantum gate G, generates a quantum gate CU† and a quantum gate R*, and generates a private key S by connecting the quantum gate CU† and the quantum gate R*.

1 Claim, 18 Drawing Sheets

(56) References Cited

U.S. PATENT DOCUMENTS

| | | | |
|---|---|---|---|
| 5,675,648 A * | 10/1997 | Townsend | 380/278 |
| 6,272,224 B1 * | 8/2001 | Mazourenko et al. | 380/283 |
| 6,289,104 B1 * | 9/2001 | Patterson et al. | 380/283 |
| 6,456,994 B1 * | 9/2002 | Tucci | 706/52 |
| 6,678,379 B1 * | 1/2004 | Mayers et al. | 380/278 |
| 6,895,091 B1 * | 5/2005 | Elliott et al. | 380/278 |
| 7,310,623 B2 * | 12/2007 | Beausoleil et al. | 706/15 |
| 7,359,512 B1 * | 4/2008 | Elliott | 380/253 |
| 7,376,547 B2 * | 5/2008 | Meredith | 703/21 |
| 7,426,444 B2 * | 9/2008 | Beausoleil et al. | 702/72 |
| 7,430,295 B1 * | 9/2008 | Pearson et al. | 380/256 |
| 7,496,203 B2 * | 2/2009 | Choi et al. | 380/263 |
| 7,532,400 B2 * | 5/2009 | Zoller et al. | 359/577 |
| 7,567,596 B2 * | 7/2009 | Dantus et al. | 372/30 |
| 7,620,672 B2 * | 11/2009 | Tucci | 708/100 |
| 7,649,996 B2 * | 1/2010 | Nishioka et al. | 380/255 |
| 7,769,173 B2 * | 8/2010 | Munro et al. | 380/255 |
| 7,899,183 B2 * | 3/2011 | Tajima et al. | 380/263 |
| 7,983,422 B2 * | 7/2011 | Kent et al. | 380/278 |
| 8,077,047 B2 * | 12/2011 | Humble et al. | 340/600 |
| 2002/0199108 A1 * | 12/2002 | Chuang et al. | 713/176 |
| 2003/0123516 A1 * | 7/2003 | Steinberg et al. | 372/102 |
| 2005/0094818 A1 * | 5/2005 | Inoue et al. | 380/278 |
| 2005/0167772 A1 * | 8/2005 | Stoneham et al. | 257/432 |
| 2005/0273306 A1 * | 12/2005 | Hilton et al. | 703/11 |
| 2006/0088157 A1 * | 4/2006 | Fujii | 380/30 |
| 2006/0115086 A1 * | 6/2006 | Beausoleil et al. | 380/263 |
| 2006/0256966 A1 * | 11/2006 | Kuang et al. | 380/256 |
| 2007/0009098 A1 * | 1/2007 | Tanaka et al. | 380/30 |
| 2007/0130455 A1 * | 6/2007 | Elliott | 713/150 |
| 2007/0162262 A1 * | 7/2007 | Tucci | 703/1 |
| 2007/0230688 A1 * | 10/2007 | Tajima et al. | 380/30 |
| 2009/0175152 A1 * | 7/2009 | Torii | 369/116 |
| 2010/0070780 A1 * | 3/2010 | Murao et al. | 713/190 |
| 2010/0299526 A1 * | 11/2010 | Wiseman et al. | 713/171 |
| 2010/0329459 A1 * | 12/2010 | Wiseman et al. | 380/256 |

FOREIGN PATENT DOCUMENTS

| | | |
|---|---|---|
| JP | 2008-294666 | 12/2008 |
| WO | WO 2007123869 A2 * | 11/2007 |

OTHER PUBLICATIONS

Tatsuaki Okamoto, et al., "Quantum Public-Key Cryptosystems", Proc. of CRYTPTO 2000, LNCS 1880, pp. 147-165.

Peter W. Shor, "Polynomial-Time Algorithms for Prime Factorization and Discrete Logarithms on a Quantum Computer", Proceedings of the 35$^{th}$ Annual Symposium on Foundations of Computer Science, Nov. 1994, IEEE Computer Society Press, pp. 1-28.

Akinori Kawachi, et al., "Computational Indistinguishability between Quantum States and Its Cryptographic Application", Proc. EUROCRYPT 2005, LNCS 3494, pp. 1-24.

Nielsen, et al., "Quantum Computation" Cambridge University Press, pp. 171-204, pp. 213-215 and pp. 649-664.

Robert Raussendorf, et al., "A One-Way Quantum Computer", Physical Review Letters, vol. 86, No. 22, May 2001, pp. 5188-5191.

Charles H. Bennett, et al., "Strengths and Weaknesses of Quantum Computing", To appear in SIAM Journal on Computing (special issue on quantum computing), Dec. 1996, pp. 1-18.

* cited by examiner

FIG.8
(OPERATION OF OBFUSCATION UNIT 120)
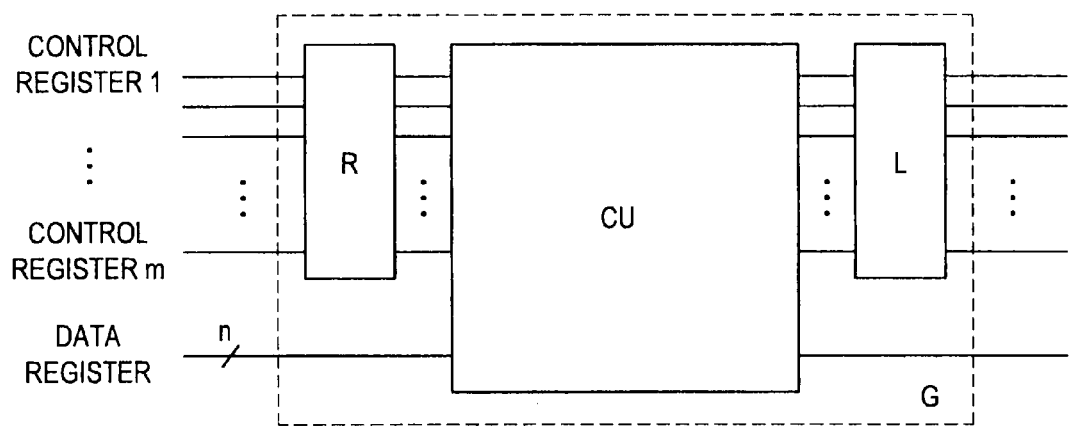
OBFUSCATION
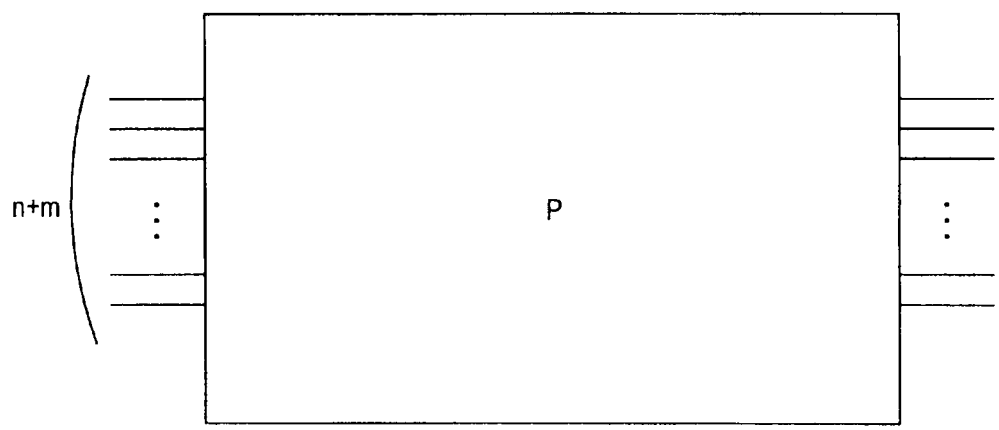

FIG. 9
(METHOD OF OBFUSCATION)
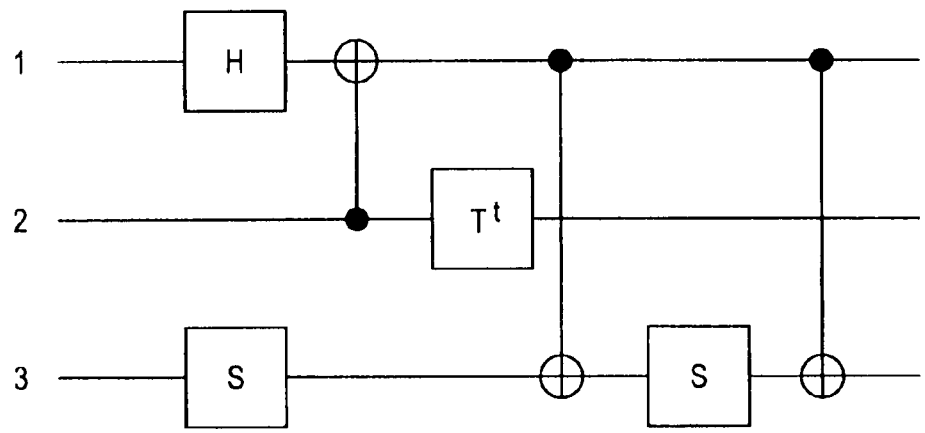
Step.1: LABELLING OF COMBINATION
OF SIMULTANEOUSLY EXECUTABLE
QUANTUM CIRCUITS
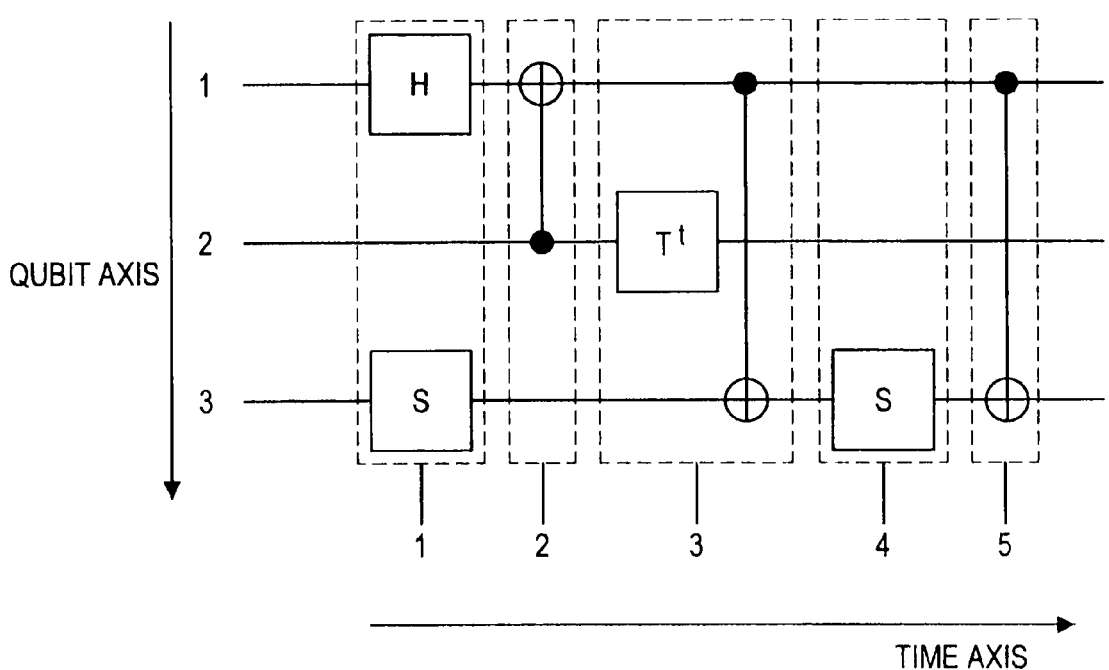

FIG.10
(METHOD OF OBFUSCATION)
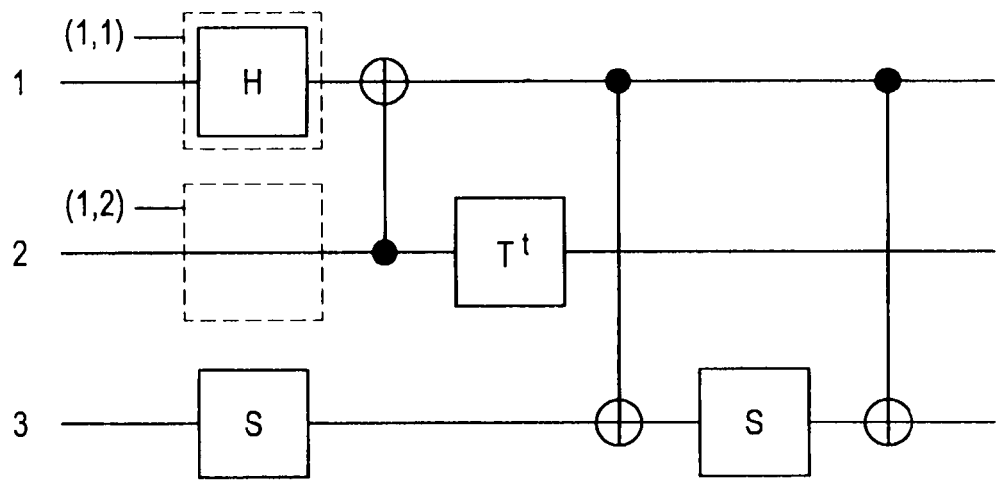
Step.2: SELECTION OF PARTIAL QUANTUM PROGRAM TO BE OBFUSCATION TARGET
{(1,1)}, {(2,2)}, {(3,1),(3,2)}, {(4,3)}
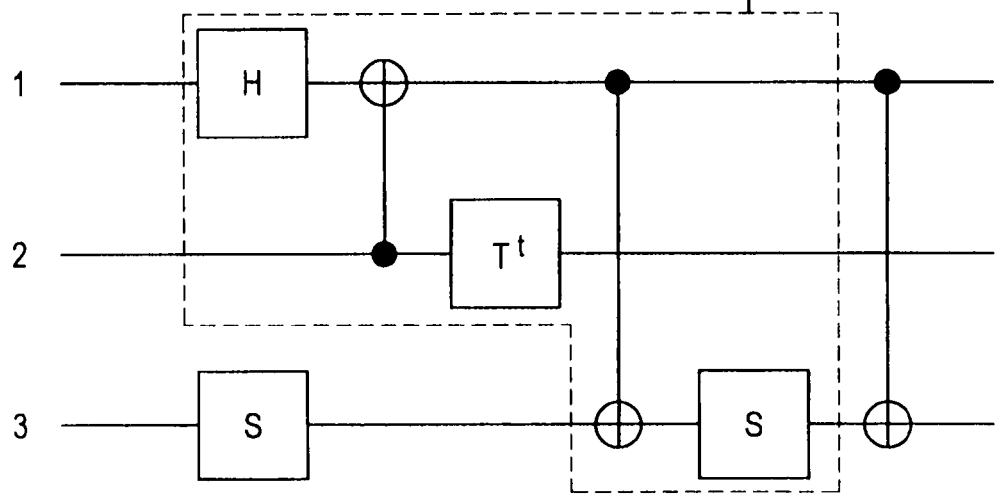
Step.3: OBFUSCATION (OPERATION OF CONNECTION UNIT 134)

(ENCRYPTION METHOD)

QUANTUM PUBLIC KEY ENCRYPTION SYSTEM

CROSS-REFERENCE TO RELATED APPLICATIONS

The present application contains subject matter related to that disclosed in Japanese Priority Patent Application JP 2009-285698 filed in the Japan Patent Office on Dec. 16, 2009, the entire content of which is hereby incorporated by reference.

BACKGROUND OF THE INVENTION

1. Field of the Invention

The present invention relates to a quantum public key encryption system, a key generation apparatus, an encryption apparatus, a decryption apparatus, a key generation method, an encryption method, and a decryption method.

2. Description of the Related Art

With a rapid development of information processing technology and communication technology, digitisation of document, regardless of official or private, is rapidly advancing. Accordingly, many individuals and companies are greatly interested in secure management of electronic documents. With the increase in the interest, security against tampering, such as eavesdropping and forgery, are being hotly debated in many fields. The security against eavesdropping on an electronic document is ensured by encrypting the electronic document, for example. Also, the security against forgery of an electronic document is ensured by using a digital signature, for example. However, encryption and the digital signature have to be sufficiently tamper-resistant.

Public key encryption that is currently widely used takes computational complexity of a classical computer as a basis for security. For example, RSA encryption takes "difficulty of prime factorisation of a large composite number (hereinafter, prime factorisation problem)" as a basis for security. Also, DSA encryption and ElGamal encryption take "difficulty of solving discrete logarithm problem" as a basis for security. However, a quantum computer is said to be capable of efficiently computing solutions to the prime factorisation problem and the discrete logarithm problem. That is, the security of the encryption described above that is currently widely used is not guaranteed once the quantum computer is realised.

Additionally, the expression "classical" is used in a sense that it is not "quantum." Also, the expression "quantum" means basing on a principle of quantum mechanics or application of the principle of quantum mechanics. For example, the quantum computer is a calculator adopting a superposition principle of quantum mechanics. Also, a quantum key distribution scheme such as BB84 uses an uncertainty principle of quantum mechanics.

Against the background of such circumstances, researches on public key cryptosystem that guarantees security even if the quantum computer is realised are actively conducted. One direction of the researches is to realise public key cryptosystem in a classical communication channel by taking, as a basis for security, a problem that is difficult to efficiently calculate (for example, difficulty of solving a multivariable polynomial) even when using the quantum computer. Also, another direction is to realise a quantum public key cryptosystem that guarantees security against an attack using the quantum computer, by using a quantum communication channel and quantum computation. For example, T. Okamoto, K. Tanaka, S. Uchiyama, "Quantum Public Key Cryptosystems", Proc. of CRYTPTO 2000, LNCS 1880, pp. 147-pp. 165, Springer-Verlag (2000), Japan Patent No. 3615132 and JP-A-2008-294666 disclose examples of findings of the researches relating to the quantum public key cryptosystem.

The quantum public key cryptosystems disclosed by Okamoto et al. and Japan Patent No. 3615132 take computational complexity of a subset sum problem, which is a special case of a knapsack problem, as a basis for security. This subset sum problem is a problem of determining "whether a subset can be appropriately selected from given n integers $a_1, \ldots, a_n$ and the sum of numbers belonging to the subset can be made equal to a given number N." This subset sum problem belongs to a computational class NP-complete. However, it is not self-evident whether it is extremely difficult to solve the subset sum problem by using the quantum computer. Accordingly, it is difficult to say that the quantum public key cryptosystems disclosed by Okamoto et al. and Japan Patent No. 3615132 are absolutely safe against an attack using the quantum computer.

Furthermore, the quantum public key cryptosystem disclosed by Japan Patent No. 3615132 uses a quantum state as a public key. Therefore, when using the quantum public key cryptosystem disclosed by Japan Patent No. 3615132, an issue as follows arises. Normally, a public key used by a public key cryptosystem is certified by a certificate authority. If a public key is information that is classically described (hereinafter, classical information), whether the public key is definitely certified by the certificate authority or not can be verified. However, it is not self-evident whether it is possible to verify certification/non-certification of a public key represented by the quantum state (hereinafter, quantum public key). For example, the quantum state changes by measurement, and thus, when verifying certification/non-certification of a quantum public key, there is a possibility that the quantum public key becomes useless as a public key.

On the other hand, a quantum public key cryptosystem disclosed by JP-A-2008-294666 uses a hybrid-type public key (hereinafter, hybrid public key) that combines the quantum state and the classical information. The hybrid public key includes a classical information part. Thus, by performing authentication by using the classical information part and verifying certification/non-certification by using the classical information part, verification of certification/non-certification is enabled without disturbing the quantum state. Of course, verification is not performed on the quantum state. However, if the quantum state is altered in some way, there will be an inconsistency with the verified classical information, and thus, encryption using the hybrid public key or decryption using a private key will fail. Accordingly, in reality, not performing verification on the quantum state will not be an issue.

SUMMARY OF THE INVENTION

However, the hybrid public key disclosed by JP-A-2008-294666 somewhat lacks convenience. As described above, the hybrid public key is formed from a combination of the classical information and the quantum state. That is, a key in the quantum state individually corresponds to each piece of classical information that is distributed. Accordingly, cost for key generation increases. Also, success or failure of encryption/decryption is determined upon completion of decryption processing, and thus, in a case of failure of encryption/decryption, efficiency is decreased due to unnecessary communication performed until the completion of the decryption processing. For the reasons described above, a mechanism is desired by which security against an attack by the quantum computer is guaranteed, certification of a public key is possible, and inefficiency of encryption/decryption processing in a quantum public key cryptosystem can be avoided.

In light of the foregoing, it is desirable to provide a quantum public key encryption system, a key generation apparatus, an encryption apparatus, a decryption apparatus, a key generation method, an encryption method, and a decryption method, which are new and improved, and which are capable of realising a safer and more convenient quantum public key cryptosystem.

According to an embodiment of the present invention, there is provided a quantum public key encryption system which includes a first quantum information processing apparatus, a second quantum information processing apparatus connected to the first quantum information processing apparatus through a quantum communication channel, and a certificate authority connected to the first and second quantum information processing apparatuses through a classical communication channel. The first quantum information processing apparatus includes a key generation unit that generates a public key and a private key, a first classical transmission unit that transmits the public key generated by the key generation unit to the certificate authority through the classical communication channel, a first quantum reception unit that receives an encrypted quantum state transmitted through the quantum communication channel from the second quantum information processing apparatus, and a decryption unit that restores an original quantum state from the encrypted quantum state received by the first quantum reception unit, by using the private key generated by the key generation unit. The certificate authority includes a first classical reception unit that receives the public key transmitted through the classical communication channel from the first quantum information processing apparatus, a certificate unit that certifies the public key received by the first classical reception unit, and a second classical transmission unit that transmits the public key certified by the certificate unit to the second quantum information processing apparatus through the classical communication channel. The second quantum information processing apparatus includes a second classical reception unit that receives the public key transmitted through the classical communication channel from the certificate unit, an encryption unit that encrypts a quantum state by using the public key received by the second classical reception unit, and a quantum transmission unit that transmits the quantum state encrypted by the encryption unit to the first quantum information processing apparatus through the quantum communication channel.

The key generation unit may include a random number generator that generates a random number, a quantum program generation unit that generates, based on the random number generated by using the random number generator, quantum programs $U_i$, L and R corresponding respectively to m types of unitary operations $U_i$ ($i=1$ to m) corresponding to n qubits and two types of unitary operations L and R corresponding to m qubits, a quantum program control enable unit that generates a quantum program CU whose control is enabled such that operation of the quantum program $U_i$ is controlled according to an input state of the m qubits, a quantum program addition unit that generates a quantum program G by adding the quantum programs L and R to the quantum program CU, a quantum program obfuscation unit that generates a quantum program P corresponding to the public key by obfuscating the quantum program G, an inverse quantum program generation unit that generates a quantum program CU† corresponding to a Hermitian conjugate CU† of a unitary operation CU corresponding to the quantum program CU and a quantum program R* corresponding to a complex conjugate R* of the unitary operation R, and a quantum program connection unit that generates a quantum program S corresponding to the private key by connecting the quantum program CU† and the quantum program R*.

The encryption unit may be configured from a quantum computer. The encryption unit may calculate the encrypted quantum state by generating a 2m-qubit maximally entangled state and inputting, of the 2m-qubit maximally entangled state, an n-qubit quantum state $|\psi_n\rangle$ that is to be transmitted and an m-qubit quantum state to the quantum program P corresponding to the public key.

The decryption unit may be configured from a quantum computer. The decryption unit may calculate an original quantum state $|\psi_n\rangle$ by inputting the encrypted quantum state to the quantum program S corresponding to the private key.

The encryption unit may calculate the encrypted quantum state by generating the 2m-qubit maximally entangled state, holding, of the 2m-qubit maximally entangled state, the m-qubit quantum state and inputting a remaining m-qubit quantum state to the quantum program P together with the quantum state $|\psi_n\rangle$, and adding, to output of the quantum program P corresponding to the quantum state $|\psi_n\rangle$, the m-qubit quantum state that is been held.

The quantum program obfuscation unit may obfuscate the quantum program G by replacing the quantum program G by another quantum program G' having same computational contents as a unitary operation corresponding to the quantum program G.

The quantum program obfuscation unit may obfuscate the quantum program G by replacing a partial quantum program g forming a part of the quantum program G by another quantum program g' having same computational contents as the partial quantum program g.

According to another embodiment of the present invention, there is provided a key generation apparatus which includes a random number generator that generates a random number, a quantum program generation unit that generates, based on the random number generated by using the random number generator, quantum programs $U_i$, L and R corresponding respectively to m types of unitary operations $U_i$ ($i=1$ to m) corresponding to n qubits and two types of unitary operations L and R corresponding to m qubits, a quantum program control enable unit that generates a quantum program CU whose control is enabled such that operation of the quantum program $U_i$ is controlled according to an input state of the m qubits, a quantum program addition unit that generates a quantum program G by adding the quantum programs L and R to the quantum program CU, a quantum program obfuscation unit that generates a quantum program P corresponding to a public key by obfuscating the quantum program G, an inverse quantum program generation unit that generates a quantum program CU† corresponding to a Hermitian conjugate CU† of a unitary operation CU corresponding to the quantum program CU and a quantum program R* corresponding to a complex conjugate R* of the unitary operation R, and a quantum program connection unit that generates a quantum program S corresponding to a private key by connecting the quantum program CU† and the quantum program R*.

According to another embodiment of the present invention, there is provided an encryption apparatus which includes a public key holding unit that holds a quantum program P, corresponding to a public key, generated by a key generation apparatus including a random number generator that generates a random number, a quantum program generation unit that generates, based on the random number generated by using the random number generator, quantum programs $U_i$, L and R corresponding respectively to m types of unitary operations $U_i$ (i=1 to m) corresponding to n qubits and two types of unitary operations L and R corresponding to m qubits, a quantum program control enable unit that generates a quantum program CU whose control is enabled such that operation of the quantum program $U_i$ is controlled according to an input state of the m qubits, a quantum program addition unit that generates a quantum program G by adding the quantum programs L and R to the quantum program CU, and a quantum program obfuscation unit that generates the quantum program P corresponding to the public key by obfuscating the quantum program G, an entangled state generation unit that generates a 2m-qubit maximally entangled state by using a quantum computer, and an encryption unit that calculates an encrypted quantum state by inputting, to the quantum program P corresponding to the public key, a part of the maximally entangled state generated by the entangled state generation unit and an n-qubit quantum state that is to be transmitted, by using the quantum computer.

According to another embodiment of the present invention, there is provided a decryption apparatus which includes a private key holding unit that holds a quantum program S, corresponding to a private key, generated by a key generation apparatus including a random number generator that generates a random number, a quantum program generation unit that generates, based on the random number generated by using the random number generator, quantum programs $U_i$, L and R corresponding respectively to m types of unitary operations $U_i$ (i=1 to m) corresponding to n qubits and two types of unitary operations L and R corresponding to m qubits, a quantum program control enable unit that generates a quantum program CU whose control is enabled such that operation of the quantum program $U_i$ is controlled according to an input state of the m qubits, a quantum program addition unit that generates a quantum program G by adding the quantum programs L and R to the quantum program CU, a quantum program obfuscation unit that generates a quantum program P corresponding to a public key by obfuscating the quantum program G, an inverse quantum program generation unit that generates a quantum program CU† corresponding to a Hermitian conjugate CU† of a unitary operation CU corresponding to the quantum program CU and a quantum program R* corresponding to a complex conjugate R* of the unitary operation R, and a quantum program connection unit that generates the quantum program S corresponding to the private key by connecting the quantum program CU† and the quantum program R*, and a decryption unit that calculates an original quantum state by inputting an encrypted quantum state generated by using the quantum program P corresponding to the public key to the quantum program S corresponding to the private key, by using a quantum computer.

According to another embodiment of the present invention, there is provided a key generation method which includes the steps of generating a random number, generating, based on the random number generated in the step of generating a random number, quantum programs $U_i$ L and R corresponding respectively to m types of unitary operations $U_i$ (i=1 to m) corresponding to n qubits and two types of unitary operations L and R corresponding to m qubits, generating a quantum program CU whose control is enabled such that operation of the quantum program $U_i$ is controlled according to an input state of the m qubits, generating a quantum program G by adding the quantum programs L and R to the quantum program CU, generating a quantum program P corresponding to a public key by obfuscating the quantum program G, generating a quantum program CU† corresponding to a Hermitian conjugate CU† of a unitary operation CU corresponding to the quantum program CU and a quantum program R* corresponding to a complex conjugate R* of the unitary operation R, and generating a quantum program S corresponding to a private key by connecting the quantum program CU† and the quantum program R*.

According to another embodiment of the present invention, there is provided an encryption method which includes the steps of generating a 2m-qubit maximally entangled state by using a quantum computer, and calculating an encrypted quantum state by using the quantum computer and inputting, of the 2m-qubit maximally entangled state generated in the step of generating a 2m-qubit maximally entangled state, an n-qubit quantum state that is to be transmitted and an m-qubit quantum state to a quantum program P, corresponding to a public key, generated by a key generation apparatus including a random number generator that generates a random number, a quantum program generation unit that generates, based on the random number generated by using the random number generator, quantum programs $U_i$, L and R corresponding respectively to m types of unitary operations $U_i$ (i=1 to m) corresponding to n qubits and two types of unitary operations L and R corresponding to m qubits, a quantum program control enable unit that generates a quantum program CU whose control is enabled such that operation of the quantum program $U_i$ is controlled according to an input state of the m qubits, a quantum program addition unit that generates a quantum program G by adding the quantum programs L and R to the quantum program CU, and a quantum program obfuscation unit that generates the quantum program P corresponding to the public key by obfuscating the quantum program G.

According to another embodiment of the present invention, there is provided a decryption method which includes the step of calculating an original quantum state by using a quantum computer and inputting an encrypted quantum state generated by using a quantum program P corresponding to a public key to a quantum program S, corresponding to a private key, generated by a key generation apparatus including a random number generator that generates a random number, a quantum program generation unit that generates, based on the random number generated by using the random number generator, quantum programs $U_i$ L and R corresponding respectively to m types of unitary operations $U_i$ (i=1 to m) corresponding to n qubits and two types of unitary operations L and R corresponding to m qubits, a quantum program control enable unit that generates a quantum program CU whose control is enabled such that operation of the quantum program $U_i$ is controlled according to an input state of the m qubits, a quantum program addition unit that generates a quantum program G by adding the quantum programs L and R to the quantum program CU, a quantum program obfuscation unit that generates the quantum program P corresponding to the public key by obfuscating the quantum program G an inverse quantum program generation unit that generates a quantum program CU† corresponding to a Hermitian conjugate CU† of a unitary operation CU corresponding to the quantum program CU and a quantum program R* corresponding to a complex conjugate R* of the unitary operation R, and a quantum program connection unit that generates the quantum program S corresponding to the private key by connecting the quantum program CU† and the quantum program R*.

According to the embodiments of the present invention described above, a safer and more convenient quantum public key cryptosystem is realised by using a property that a representation basis of a maximally entangled state is non-unique.

BRIEF DESCRIPTION OF THE DRAWINGS

FIG. 8 is an explanatory diagram showing an example of an obfuscation method according to the embodiment;

FIG. 9 is an explanatory diagram showing an example of the obfuscation method according to the embodiment;

FIG. 10 is an explanatory diagram showing an example of the obfuscation method according to the embodiment;

DETAILED DESCRIPTION OF THE EMBODIMENT(S)

Figure 1:
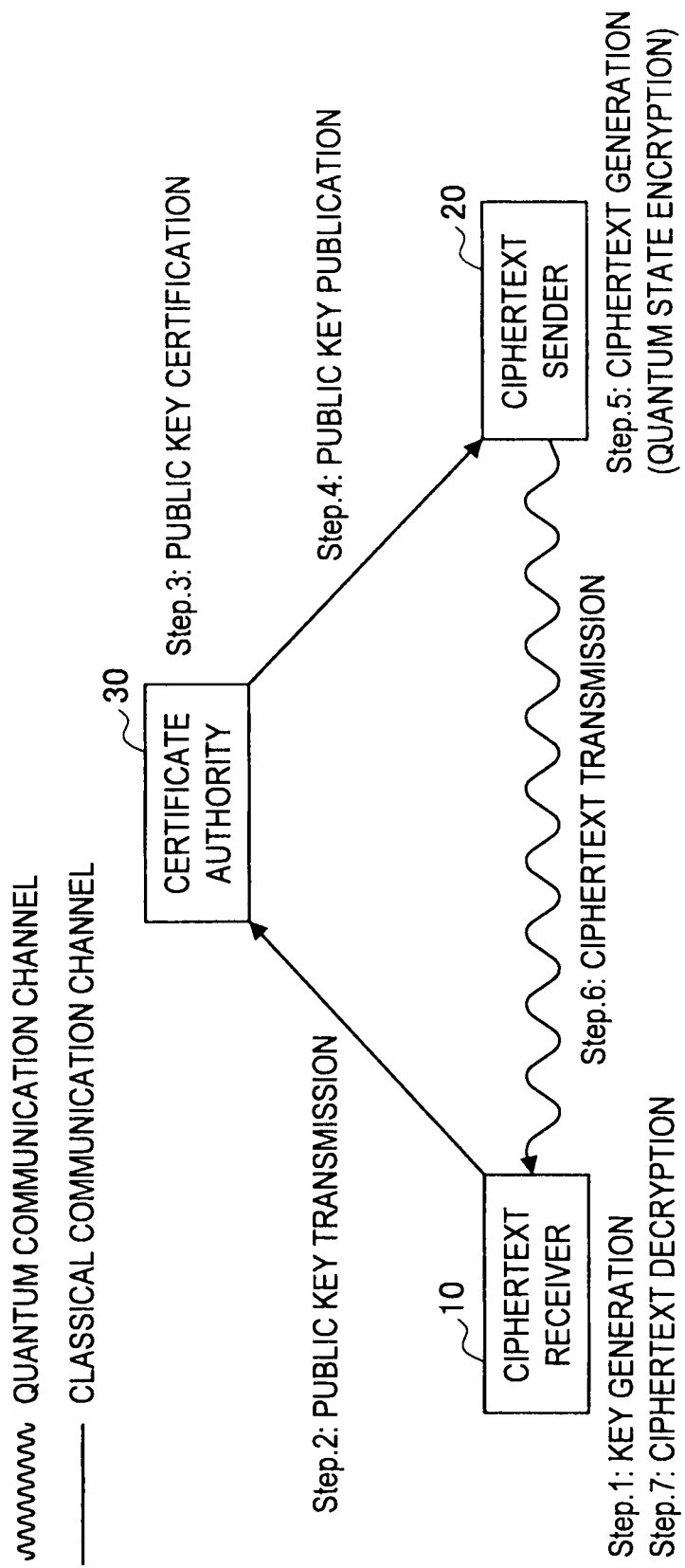
FIG. 1 is an explanatory diagram showing an example of an overall configuration of a quantum public key encryption system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of a description relating to an embodiment of the present invention described later will be briefly mentioned here. First, an overall configuration of a quantum public key encryption system according to the embodiment will be described with reference to FIG. 1. Next, a functional configuration of a key generation apparatus 100 for generating a public key and a private key used in the quantum public key encryption system according to the embodiment will be described with reference to FIG. 2. Then, a flow of key generation processing performed by the key generation apparatus 100 and contents of the processing will be described with reference to FIGS. 3 to 12.

Next, a functional configuration of an encryption apparatus 200 for encrypting, in the quantum public key encryption system according to the embodiment, a quantum state to be transmitted will be described with reference to FIG. 13. Also, a flow of encryption processing performed by the encryption apparatus 200 and contents of the processing will be described with reference to FIGS. 14 and 15. Next, a functional configuration of a decryption apparatus 300 for restoring, in the quantum public key encryption system according to the embodiment, an original quantum state from an encrypted quantum state will be described with reference to FIG. 16. Also, a flow of decryption processing performed by the decryption apparatus 300 and contents of the processing will be described with reference to FIGS. 17 and 18.

(Description Items)

1: Configuration of Quantum Public Key Encryption System

2: Key Generation Method
  2-1: Functional Configuration of Key Generation Apparatus 100
    2-1-1: Function of Public Key Generation Unit 110
    2-1-2: Function of Private Key Generation Unit 130
  2-2: Details of Key Generation Processing
    2-2-1: Generation Method of Public Key P
    2-2-2: Generation Method of Private Key S 3: Encryption Method
  3-1: Functional Configuration of Encryption Apparatus 200
  3-2: Details of Encryption Processing 4: Decryption Method
  4-1: Functional Configuration of Decryption Apparatus 300
  4-2: Details of Decryption Processing 5: Summary <1: Configuration of Quantum Public Key Encryption System>

First, an overall picture of a quantum public key encryption system according to an embodiment of the present invention will be described with reference to FIG. 1. FIG. 1 is an explanatory diagram for describing an overall picture of the quantum public key encryption system and a flow of public key certification and transmission/reception of a quantum ciphertext according to the present embodiment.

As shown in FIG. 1, the quantum public key encryption system according to the present embodiment is configured from a ciphertext receiver 10, a ciphertext sender 20, and a certificate authority 30. The ciphertext receiver 10 is a processing block including a key generation apparatus 100 and a decryption apparatus 300 described later that is personified for the sake of explanation. Similarly, the ciphertext sender 20 is a processing block including an encryption apparatus 200 described later personified for the sake of explanation. Also, the certificate authority 30 is a reliable third-party body or a reliable certification body.

(Flow of Key Generation→Certification→Encryption→Decryption)

First, the ciphertext receiver 10 generates a pair of public key and private key (Step 1). Next, the ciphertext receiver 10 registers the public key with the certificate authority 30. At this time, the ciphertext receiver 10 transmits the public key to the certificate authority 30 through a classical communication channel (Step 2). Additionally, as described later, the public key used by the quantum public key encryption system according to the present embodiment is configured only from classical information. Also, the private key is kept secret by the ciphertext receiver 10.

Next, the certificate authority 30 certifies the public key registered by the ciphertext receiver 10 (Step 3). Then, the certificate authority 30 publishes the public key which has been certified. At this time, the certificate authority 30 transmits the certified public key to the ciphertext sender 20 through a classical communication channel (Step 4).

When the published public key is obtained through the classical communication channel, the ciphertext sender 20 verifies whether the obtained public key has been certified or not. Then, when it is confirmed that the obtained public key is certified, the ciphertext sender 20 generates a ciphertext by using a quantum computer and the public key (Step 5).

First, the ciphertext sender 20 generates a quantum state by encoding classical information desired to be transmitted or prepares a quantum state desired to be transmitted. Next, the ciphertext sender 20 generates a maximally entangled state. Then, the ciphertext sender 20 gives, as an input to a quantum program indicated by the public key, the quantum state that has been generated or prepared and a part of the maximally entangled state that has been generated, and generates a ciphertext (encrypted quantum state) by the quantum computer.

Next, the ciphertext sender 20 transmits the generated ciphertext to the ciphertext receiver 10 through a quantum communication channel (Step 6). The ciphertext receiver 10 gives, as an input to a quantum program indicated by the private key, the ciphertext received through the quantum communication channel, and restores the original quantum state by a quantum computer (Step 7).

As described above, the public key used in the quantum public key encryption system according to the present embodiment is a quantum program described in the form of classical information. Therefore, since the public key is described only by the classical information, certification/non-certification of the public key can be easily verified. Additionally, the key generation (Step 1) by the ciphertext receiver 10 is performed by the key generation apparatus 100 described later. Also, the generation of a ciphertext (Step 5) by the ciphertext sender 20 is performed by the encryption apparatus 200 described later. Furthermore, the decryption (Step 7) by the ciphertext receiver 10 is performed by the decryption apparatus 300 described later.

(Quantum Computer Model)

As described above, the quantum public key encryption system according to the present embodiment uses a quantum computer at the time of the generation of the ciphertext (Step 5) and the decryption of the ciphertext (Step 7). Also, the public key and the private key according to the present embodiment are pieces of classical information indicating a quantum program. Accordingly, first, before proceeding with the description of the present embodiment, a model of the quantum computer and a representation method of the quantum program will be briefly described.

The quantum computer takes as input the quantum program and quantum data. The quantum program is classical information describing an execution method of a quantum algorithm. On the other hand, the quantum data is a quantum state on which the quantum algorithm is to be performed. The representation method of the quantum program is different depending on a quantum computation model to be used.

As representative quantum computation model, a quantum circuit model, a quantum Turing machine model, an observation-based quantum computation model, and the like are known, for example. In the case of the quantum circuit model, the quantum program is represented by using a quantum circuit diagram. In the case of the quantum Turing machine model, the quantum program is represented by using a state transition diagram. In the case of the observation-based quantum computation model, the quantum program is represented by using a graph diagram. In the following explanation, the representation of the quantum circuit model will be used. However, it should be noted that the difference by the quantum circuit model is the difference in the representation and that the technical scope of the present embodiment is not limited to the quantum circuit model.

Additionally, for the quantum circuit model and the quantum Turing machine model, see "Nielsen and Chuang, Quantum Computation and Quantum Information, Cambridge University Press," for example. Also, for the observation-based quantum computation model, see "R. Raussendorf and H. J. Briegel, Phys. Rev. Lett., 86(5188), 2001," for example.

Heretofore, an overall picture of the quantum public key encryption system according to the present embodiment has been described. In the following, a key generation method, an encryption method and a decryption method in the quantum public key encryption system according to the present embodiment will be sequentially described in detail.

<2: Key Generation Method>

First, a key generation method according to the present embodiment will be described. A public key and a private key generated by the key generation method according to the present embodiment are represented by the quantum programs. The quantum program is a design diagram represented by a combination of unitary operations performed by a quantum computer. As described above, there are several ways of representing the quantum program, but in this specification, a representation method of the quantum circuit model (hereinafter, quantum circuit diagram) is adopted as an example.

Figure 4:
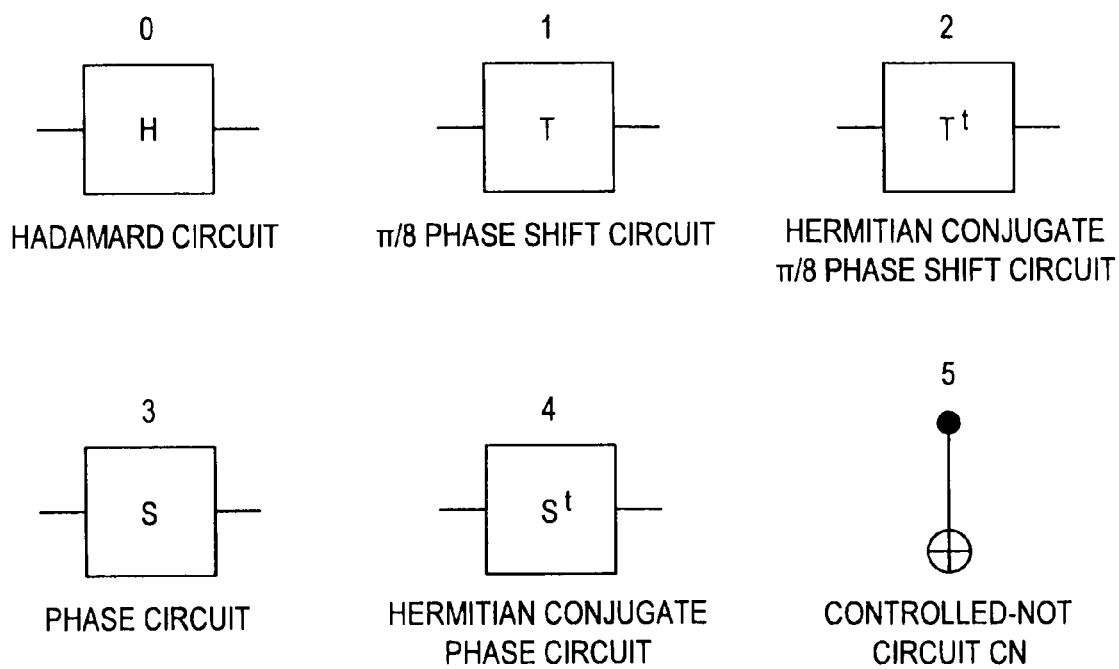
FIG. 4 is an explanatory diagram showing an example of a quantum circuit used for construction of a universal quantum circuit.

The quantum circuit diagram is designed by combining quantum circuits as shown in FIG. 4, for example. A quantum circuit included in the quantum circuit diagram is a representation of a unitary operation. Additionally, in the following explanation, the quantum circuit may be represented as the quantum program. Furthermore, a unitary operation and a quantum program performing the unitary operation are regarded as the same, and are represented by the same symbol. For example, with regard to a product UV of unitary operations U and V, quantum programs corresponding to the unitary operations U and V are represented by U and V and a quantum program corresponding to the product UV is represented by UV.

Additionally, as a realisation method of a unitary operation represented by a quantum program, various methods such as a method of using an emulator for a quantum computer by a classical computer and a method of using a quantum computer using an ion trap, cavity quantum electrodynamics (QED), nuclear magnetic resonance (NMR), a superconductor, an optical system or the like may be conceived. Also, a quantum computer used for realisation of the encryption method and the decryption method according to the present embodiment described later may perform a unitary operation based on any operating principle, or it may be operation means for a unitary operation based on other operating principles devised in the future.

<2-1: Functional Configuration of Key Generation Apparatus 100>

Figure 2:
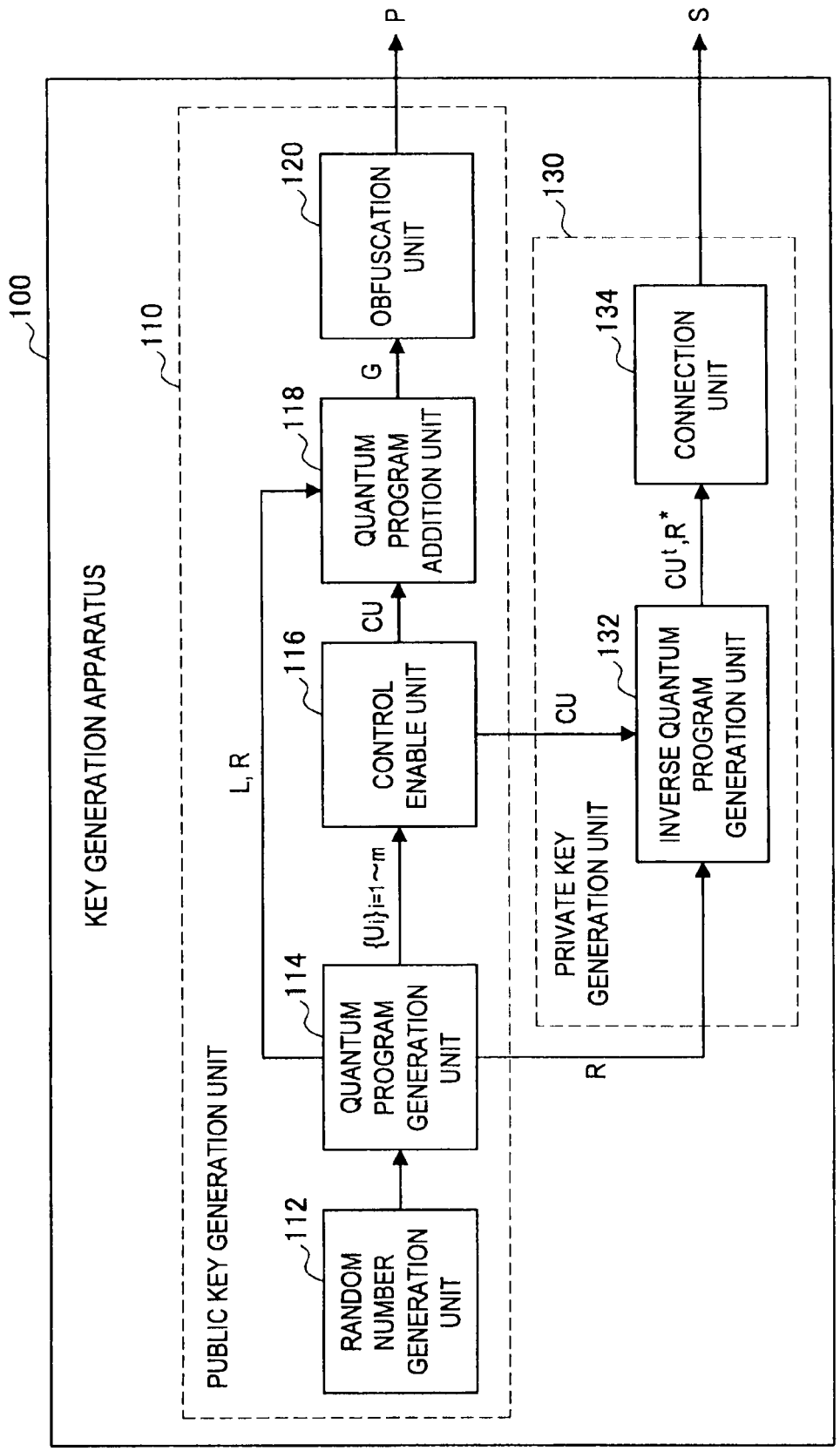
FIG. 2 is an explanatory diagram showing an example of a functional configuration of a key generation apparatus according to the embodiment.

In the following, a functional configuration of the key generation apparatus 100 for realising the key generation method according to the present embodiment will be described with reference to FIG. 2. FIG. 2 is an explanatory diagram showing an example of a functional configuration of the key generation apparatus 100 according to the present embodiment.

As shown in FIG. 2, the key generation apparatus 100 is mainly configured from a public key generation unit 110 and a private key generation unit 130. The public key generation unit 110 is a processing block for generating a public key P (a quantum program P). On the other hand, the private key generation unit 130 is a processing block for generating a private key S (a quantum program S). In the following, a function of each processing block will be described in greater detail by using a quantum circuit diagram.

Additionally, a quantum circuit diagram is used as an example here, but the technical scope of the present embodiment is not limited to the quantum circuit model. For example, by replacing a universal quantum circuit configuring the quantum circuit diagram described later by a graph diagram, a configuration based on the quantum circuit model can be modified to a configuration based on the observation-based quantum computation model.

Such modification does not affect the contents of key generation processing according to the present embodiment. Furthermore, a key generation method based on a graph diagram can be realised by constructing a graph diagram through the same operation steps as a construction method of the universal quantum circuit described later, instead of replacing the universal quantum circuit by the graph diagram.

(2-1-1: Function of Public Key Generation Unit 110)

First, a functional configuration of the public key generation unit 110 will be described.

As shown in FIG. 2, the public key generation unit 110 is mainly configured from a random number generation unit 112, a quantum program generation unit 114, a control enable unit 116, a quantum program addition unit 118, and an obfuscation unit 120. In the following, a function of each structural element will be described along a flow of generation processes of a public key.

(Function of Random Number Generation Unit 112)

First, the random number generation unit 112 generates a random number sequence by using a random number generator. As the random number generator, a physical random number generator using thermal noise, a pseudo-random number generator based on Mersenne twister method or the like is used, for example. When a random number sequence is generated, the random number generation unit 112 inputs the generated random number sequence to the quantum program generation unit 114.

(Function of Quantum Program Generation Unit 114)

The quantum program generation unit 114 generates quantum programs $U_1, \ldots, U_m$ for unitary operations $U_1, \ldots, U_m$ each having an n-qubit quantum state as an input and quantum programs L, R for unitary operations L, R having an m-qubit quantum state as an input. At this time, the quantum program generation unit 114 generates the quantum programs $U_1, \ldots, U_m$ and L and R by using the random number sequence input from the random number generation unit 112 and by randomly combining several types of quantum circuits called universal quantum circuits prepared in advance.

Figure 5:
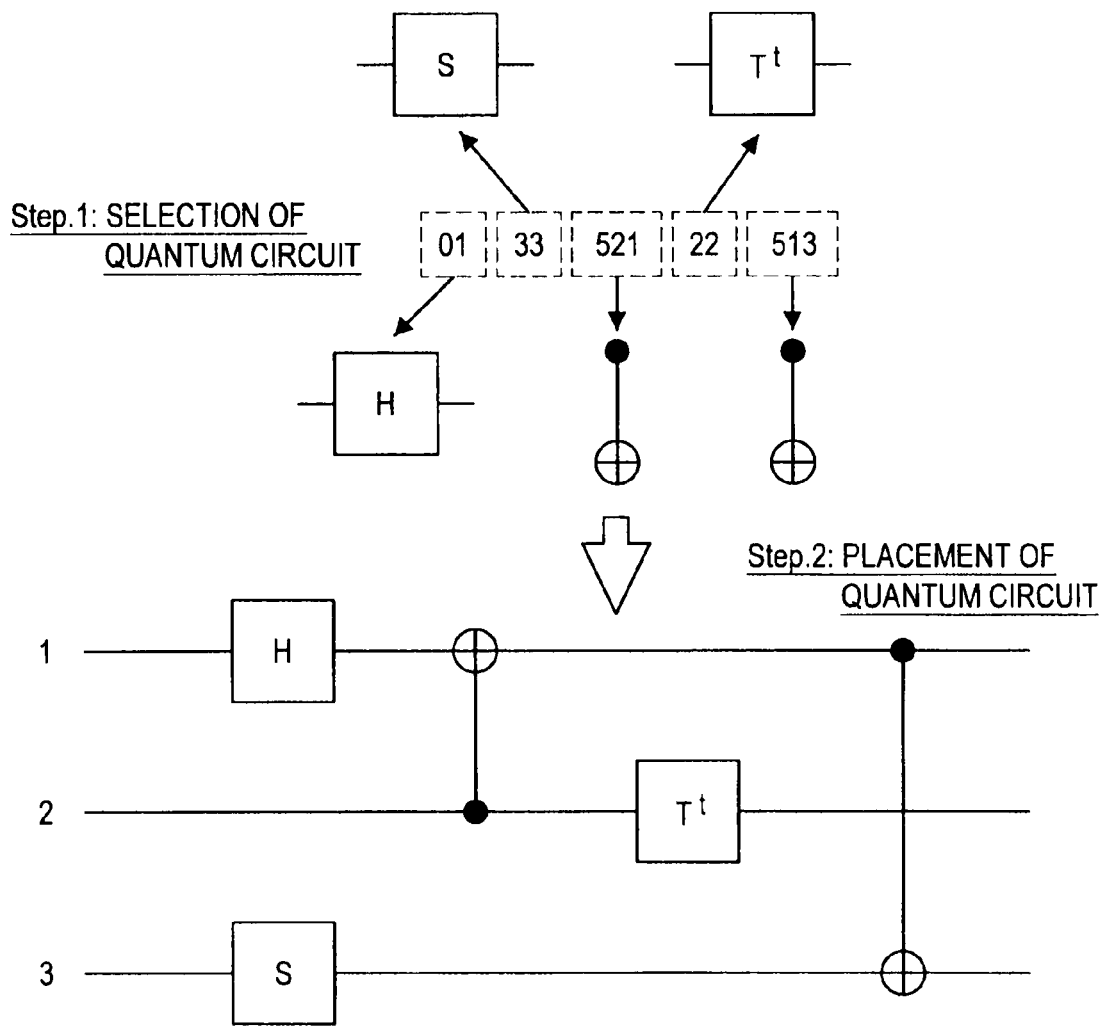
FIG. 5 is an explanatory diagram showing an example of a quantum program generation method according to the embodiment.

Here, a generation method of a quantum program X ($X=U_1, \ldots, U_m$, L, R) by the quantum program generation unit 114 will be described in detail with reference to FIGS. 4 and 5.

FIG. 4 shows examples of the universal quantum circuits used for the generation of the quantum program X. According to the examples, a Hadamard circuit H corresponding to 1 qubit, a $\pi/8$ phase shift circuit T corresponding to 1 qubit, a phase circuit S corresponding to 1 qubit, and a controlled-NOT circuit CN corresponding to 2 qubits are used as the universal quantum circuits used for the generation of the quantum program X. Also, a Hermitian conjugate $\pi/8$ phase shift circuit T† corresponding to a Hermitian conjugate T† of a unitary operation T corresponding to the $\pi/8$ phase shift circuit T and a Hermitian conjugate phase circuit S† corresponding to a Hermitian conjugate S† of a unitary operation S corresponding to the phase circuit S are used for the generation of the quantum program X.

Furthermore, as shown in FIG. 4, mutually different numbers are assigned in advance to the universal quantum circuits H, T, S, and CN. Furthermore, in a case the Hermitian conjugates are different from the original universal quantum circuit, mutually different numbers are assigned in advance to the Hermitian conjugates T† and S† of the universal quantum circuits.

In the example of FIG. 4, the Hadamard circuit H is assigned with a 0, the $\pi/8$ phase shift circuit T is assigned with a 1, the Hermitian conjugate $\pi/8$ phase shift circuit T† is assigned with a 2, the phase circuit S is assigned with a 3, the Hermitian conjugate phase circuit S† is assigned with a 4, and the controlled-NOT circuit CN is assigned with a 5. The quantum program generation unit 114 generates the quantum program X by combining these universal quantum circuits. The combination of the universal quantum circuits is determined by a method shown in FIG. 5.

Additionally, a method of generating the quantum program X including three quantum registers (quantum registers 1 to 3) is considered as a concrete example. First, the quantum program generation unit 114 makes the random number generation unit 112 generate a number between 0 and 5, and selects one universal quantum circuit by using a number input from the random number generation unit 112 (Step 1). For example, in a case 0 is input from the random number generation unit 112, the quantum program generation unit 114 selects the Hadamard circuit H assigned with 0.

In a case the universal quantum circuit selected in Step 1 is a quantum circuit corresponding to 1 qubit, the quantum program generation unit 114 makes the random number generation unit 112 generate one number between 1 and 3, and selects, by using the number input from the random number generation unit 112, a quantum register to place the universal quantum circuit on (Step 2).

On the other hand, in a case the universal quantum circuit selected in Step 1 is a quantum circuit corresponding to 2 qubits, the quantum program generation unit 114 makes the random number generation unit 112 generate two numbers between 1 and 3, and selects, by using the numbers input from the random number generation unit 112, a quantum register to place the universal quantum circuit on (Step 2).

For example, in a case the controlled-NOT circuit CN is selected in Step 1, the quantum program generation unit 114 sets the quantum register corresponding to the number input first by the random number generation unit 112 as a control register and sets the quantum register corresponding to the number input next as a target register, and places the controlled-NOT circuit CN. Here, in a case two same numbers are input from the random number generation unit 112, the quantum program generation unit 114 makes the random number generation unit 112 again generate random numbers.

The quantum program generation unit 114 generates the quantum program X by repeating the operations of Step 1 and Step 2 described above approximately p(n) times, p(n) being a polynomial function of n, and successively placing the universal quantum circuits in the quantum register based on the random number sequence input from the random number generation unit 112. The number of quantum registers is three in the above example, but the function of the quantum program generation unit 114 is not limited to such. Additionally, FIG. 5 shows an example of a quantum program X obtained by repeating the operations of Step 1 and Step 2 five times.

The quantum program generation unit 114 repeatedly performs the above method, and generates the quantum programs $U_1, \ldots, U_m$ and L and R. The quantum programs $U_1, \ldots, U_m$ corresponding to n qubits are formed from n quantum registers. Also, the quantum programs L and R corresponding to m qubits are formed from m quantum registers.

The quantum programs $U_1, \ldots, U_m$ generated by the quantum program generation unit 114 in this manner are input to the control enable unit 116, as shown in FIG. 2. Also, the quantum programs L and R generated by the quantum program generation unit 114 are input to the quantum program addition unit 118. Furthermore, the quantum program R generated by the quantum program generation unit 114 is input to an inverse quantum program generation unit 132 of the private key generation unit 130 described later.

(Function of Control Enable Unit 116)

The control enable unit 116 enables control of the quantum programs $U_1, \ldots, U_m$ input from the quantum program generation unit 114, and generates a quantum program CU. To "enable control" here means to enable selection of the quantum programs $U_1, \ldots, U_m$ to be used for computation according to the quantum state input to m control registers. The quantum program CU is represented by the quantum circuit diagram shown in FIG. 6, for example.

Figure 6:
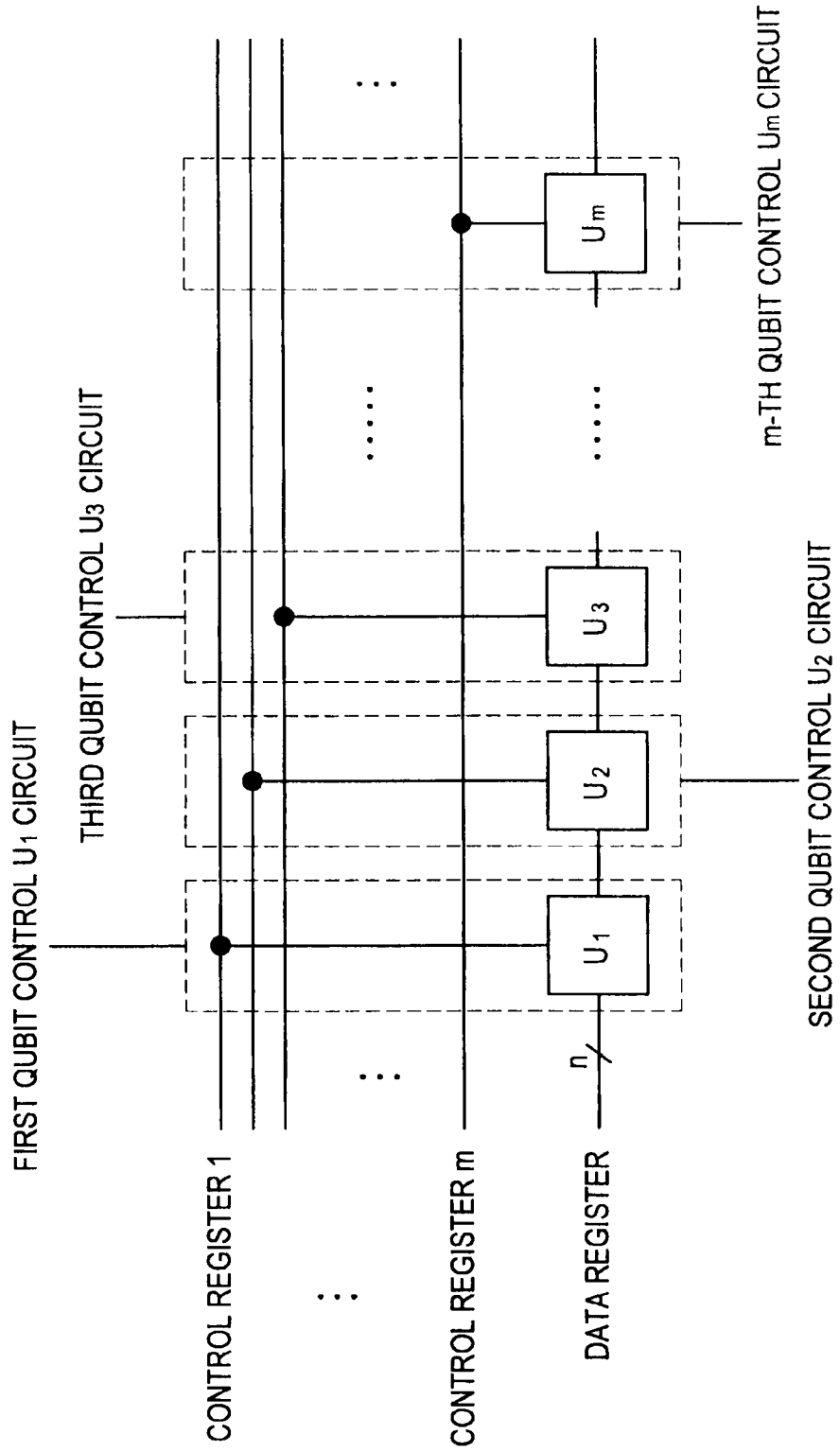
FIG. 6 is an explanatory diagram showing an example of a control enable method according to the embodiment.

As shown in FIG. 6, the quantum program CU includes m+n quantum registers. Among the m+n quantum registers, m quantum registers are control registers (control registers 1 to m) used for selection of the quantum programs $U_1, \ldots, U_m$. Also, the remaining n quantum registers are data registers in which the quantum programs $U_1, \ldots, U_m$ will be placed. Additionally, the process by the quantum program CU proceeds from left to right. Furthermore, a 1-qubit quantum state is input to each quantum register.

In the example of FIG. 6, the quantum programs $U_1, \ldots, U_m$ are sequentially placed from left to right in the data register. The control register 1 is connected to the quantum program $U_1$, the control register 2 is connected to the quantum program $U_2$, the control register 3 is connected to the quantum program $U_3, \ldots$, and the control register m is connected to the quantum program $U_m$. A circuit including the quantum program $U_1$ will be called a first qubit control $U_1$ circuit, a circuit including the quantum program $U_2$ will be called a second qubit control $U_2$ circuit, a circuit including the quantum program $U_3$ will be called a third qubit control $U_3$ circuit, ..., and a circuit including the quantum program $U_m$ will be called an m-th qubit control $U_m$ circuit.

The quantum program CU is structured such that, in a case a 1-qubit quantum state |1> is input to the control register 1, the quantum program $U_1$ is executed for a quantum state input to the data register. Similarly, the quantum program CU is structured such that, in a case a 1-qubit quantum state |1> is input to a control register k (k=2 to m), a quantum program $U_k$ is executed for a quantum state input to the data register.

Accordingly, a combination of quantum programs $U_1, \ldots, U_m$ to be executed for a quantum state input to the data register is controlled based on the quantum states input to the control registers 1 to m. Additionally, in a case a quantum state |0> is input to a control register k' (k'=1 to m), a quantum program $U_{k'}$ is not executed for the quantum state input to the data register.

The quantum program CU that is controlled-enabled in this manner is generated as follows. As described above, the quantum program $U_1$ generated by the quantum program generation unit 114 is formed from the universal quantum circuits.

A method of enabling control of the universal quantum circuit as the first qubit control $U_1$ circuit is described in "Nielsen and Chuang, Quantum Computation and Quantum Information, Cambridge University Press." Accordingly, the first qubit control $U_1$ circuit is generated by applying the method to all the universal quantum circuits included in the quantum program $U_1$ and enabling control of all the universal quantum circuits for the control register 1. Similarly, a k-th qubit control $U_k$ circuit (k=2 to m) is generated.

The quantum program CU generated by the control enable unit 116 in this manner is input to the quantum program addition unit 118, as shown in FIG. 2. Also, this quantum program CU is input to the inverse quantum program generation unit 132 of the private key generation unit 130 described later.

(Function of Quantum Program Addition Unit 118)

Figure 7:
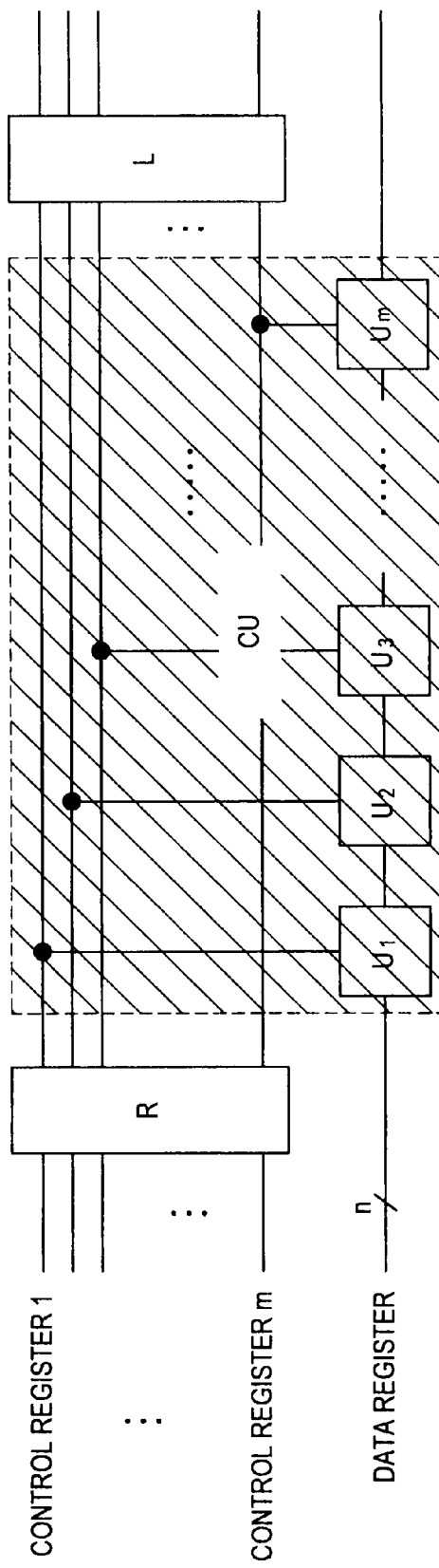
FIG. 7 is an explanatory diagram showing an example of a quantum program addition method according to the embodiment.

As described above, the quantum programs L and R generated by the quantum program generation unit 114 and the quantum program CU generated by the control enable unit 116 are input to the quantum program addition unit 118. The quantum program addition unit 118 adds the quantum programs L and R to the quantum program CU, and generates a quantum program G as shown in FIG. 7.

First, the quantum program addition unit 118 places the quantum program R before the first qubit control $U_1$ circuit. At this time, the quantum program addition unit 118 places the quantum program R such that inputs to the control registers 1 to m will be inputs to the quantum program R and outputs of the quantum program R will be inputs to the control registers 1 to m of the quantum program CU.

Next, the quantum program addition unit 118 places the quantum program L after the m-th qubit control $U_m$ circuit. At this time, the quantum program addition unit 118 places the quantum program L such that the inputs to the control registers 1 to m of the quantum program CU will be inputs to the quantum program L.

Here, a significance of adding the quantum programs R and L to the quantum program CU will be described.

For example, in a case of executing the quantum program $U_k$ included in the quantum program CU, a 1-qubit quantum state |1> has to be input to the control register k of the quantum program CU. Thus, input to the quantum program R has to be controlled such that a quantum state |1> is input to the control register k of the quantum program CU after the execution of the quantum program R.

Those who know the circuit configuration of the quantum program R can appropriately control the input to the quantum program R and input the quantum state |1> to the control register k of the quantum program CU. However, it is difficult for those who do not know the circuit configuration of the quantum program R to input the quantum state |1> to the control register k of the quantum program CU.

That is, those who do not know the quantum program R do not know what kind of quantum state is to be input to the quantum program G to specify the quantum program $U_k$ included in the quantum program CU. In other words, the significance of adding the quantum program R is to hide a method of specifying the quantum program $U_k$ included in the quantum program CU.

On the other hand, the significance of adding the quantum program L is to improve confidentiality of the quantum program R. If the quantum program L is not added in a case the quantum program CU has a characteristic structure, there is a risk that the quantum program R is separated from information on the quantum program G obtained after obfuscation described later. Therefore, the quantum programs R and L are added to the quantum program CU.

The quantum program G generated by the quantum program addition unit 118 in this manner is input to the obfuscation unit 120.

(Function of Obfuscation Unit 120)

As shown in FIG. 8, the obfuscation unit 120 converts (obfuscates) the quantum program G input from the quantum program addition unit 118 to another quantum program P. This quantum program P corresponds to a unitary operation P having the same contents as a unitary operation G corresponding to the quantum program G That is, the obfuscation unit 120 converts the quantum program G to the quantum program P without changing the contents of the unitary operation. This conversion makes it difficult to obtain information on the quantum program R from the quantum program P. As a result, the information on the quantum program CU is kept secret. The obfuscation unit 120 outputs the quantum program P as a public key P.

Here, the method of obfuscation described above will be described in greater detail with reference to FIGS. 9 and 10. Additionally, a method of obfuscating a quantum program U formed from approximately p(n) universal quantum circuits, p(n) being a polynomial function, will be described here.

First, the obfuscation unit 120 moves all the universal quantum circuits forming the quantum program U over to the left. By performing this operation, it becomes easy to distinguish a set of universal quantum circuits that can be executed simultaneously.

Next, as shown in FIG. 9, the obfuscation unit 120 assigns a number to each combination of universal quantum circuits that can be executed simultaneously (labelling; Step 1). Here, the number of combinations of universal quantum circuits that can be executed simultaneously is approximately one for each quantum register.

Therefore, by specifying the number of a quantum register (hereinafter, register number) and the number assigned to a combination of universal quantum circuits that can be executed simultaneously (hereinafter, combination number), the obfuscation unit 120 can specify one universal quantum circuit, as shown in FIG. 10.

Next, the obfuscation unit 120 generates a random number r by using a random number generator. Here, the random number r is a number between 1 and a maximum combination number. Then, the obfuscation unit 120 specifies one set of universal quantum circuits corresponding to the combination number equivalent to the random number r. Next, the obfuscation unit 120 generates a random number sequence $(r_1, r_2, \ldots, r_s)$ having approximately s=log(n) random numbers by using a random number generator for generating random numbers between 1 and n.

Next, the obfuscation unit 120 specifies a universal quantum circuit $(r, r_i) = \{(r, r_1), (r, r_2), \ldots, (r, r_s)\}$ included in the specified set by using the generated random number sequence. However, in a case there is no universal quantum circuit at the specified position, the obfuscation unit 120 ignores the position. Also, in a case universal quantum circuits are not present at all the specified positions, the obfuscation unit 120 again generates a random number sequence by using the random number generator.

Next, with respect to the specified universal quantum circuit, the obfuscation unit 120 successively adds, to the group, universal quantum circuits adjacent in the positive direction of time. However, if, in the process of adding universal quantum circuits to the group, one of a control unit and a target unit of the controlled-NOT circuit CN specifies a quantum register $r_{s+1}$ not included in the specified set of quantum registers $(r_1, r_2, \ldots, r_s)$, the obfuscation unit 120 newly adds the quantum register $r_{s+1}$ to the set of quantum registers and generates a new set of quantum registers $(r_1, r_2, \ldots, r_s, r_{s+1})$.

Then, with respect to the new set of quantum registers $(r_1, r_2, \ldots, r_s, r_{s+1})$, the obfuscation unit 120 successively adds, to the group, universal quantum circuits adjacent in the positive direction of time. The obfuscation unit 120 keeps adding universal quantum circuits to the group until the total of the universal quantum circuits is approximately log O(p(n)).

The set of universal quantum circuits $[\{(r, r_i)\}, \{(r, r_j)\}, \{(r, r_k)\}]$ generated in this manner is called a partial quantum program g. By the method described above, the obfuscation unit 120 selects the partial quantum program g from the quantum programs U (Step 2).

Additionally, in the process of selecting the partial quantum program g, if there is arbitrariness in the selection of universal quantum circuits, selection is to be performed by using random numbers. Next, the obfuscation unit 120 replaces the selected partial quantum program g by another equivalent partial quantum program g' without changing a unitary operation g represented by the partial quantum program g.

For example, the obfuscation unit 120 performs exhaustive search on partial quantum programs equivalent to the partial quantum program g, and randomly selects one partial quantum program g' from the detected partial quantum programs.

In this example, since the number of universal quantum circuits included in the quantum program U is approximately log O(p(n)), the representation of a partial quantum program to which replacement is possible is O(p(n)) or less. Accordingly, the exhaustive search on the partial quantum programs ends within a polynomial time. Additionally, in a case there is no partial quantum program to which replacement is possible, the number of universal quantum circuits may be simply increased to approximately log O(p(n))+2.

By sufficiently repeating the above process, albeit a polynomial number of times, obfuscation of the quantum program G is realised. Additionally, a partial quantum program at a part from the quantum program R to the quantum program CU is preferably executed a polynomial of n times but a sufficient number of times.

(Computational Complexity Realised by Obfuscation)

As has been described, the quantum public key encryption system according to the present embodiment takes the difficulty of extracting the quantum program R as a basis for security. Conversely, an eavesdropper can break the quantum public key encryption system if he/she succeeds in extracting the quantum program R. In the quantum public key encryption system according to the present embodiment, the difficulty of extracting the quantum program R is realised by the above-described obfuscation. When using the obfuscation method according to the present embodiment, a high computation complexity of the quantum program is realised.

An attack by an eavesdropper to extract the quantum program R from the quantum program P generated by using the obfuscation method according to the present embodiment belongs to a quantum computational complexity class: Quantum Merlin-Arthur difficulty (QMA difficulty). Additionally, the obfuscation method according to the present embodiment can be applied to an arbitrary quantum program.

Furthermore, one may think that an eavesdropper may obtain, in addition to the quantum program P, a ciphertext transmitted by a person other than the eavesdropper and try to extract the quantum program R from these pieces of information. However, such attack is meaningless. This is because the eavesdropper can also encrypt an arbitrary quantum state by using the quantum program P, which is the public key P.

That is, the attack to extract the quantum program R from a combination of the quantum program P and the ciphertext is equivalent to the attack to extract the quantum program R from the quantum program P. Accordingly, by adopting the obfuscation method according to the present embodiment, high security is guaranteed.

Heretofore, the function of the public key generation unit 110 has been described.

(2-1-2: Function of Private Key Generation Unit 130)

Next, a function of the private key generation unit 130 will be described.

As shown in FIG. 2, the private key generation unit 130 is mainly configured from an inverse quantum program generation unit 132 and a connection unit 134. In the following, a function of each structural element will be described along a flow of generation processes of a private key.

(Function of Inverse Quantum Program Generation Unit 130)

As has been described in the description of the public key generation unit 110, the quantum program R generated by the quantum program generation unit 114 and the quantum program CU generated by the control enable unit 116 are input to the inverse quantum program generation unit 132.

First, the inverse quantum program generation unit 132 generates a quantum program R* corresponding to a complex conjugate R* of a unitary operation R corresponding to the quantum program R. Also, the inverse quantum program generation unit 132 generates a quantum program CU† corresponding to a Hermitian conjugate CU† of a unitary operation CU corresponding to the quantum program CU. The generation of these quantum programs R* and CU† are performed in the manner shown in FIG. 11.

Figure 11:
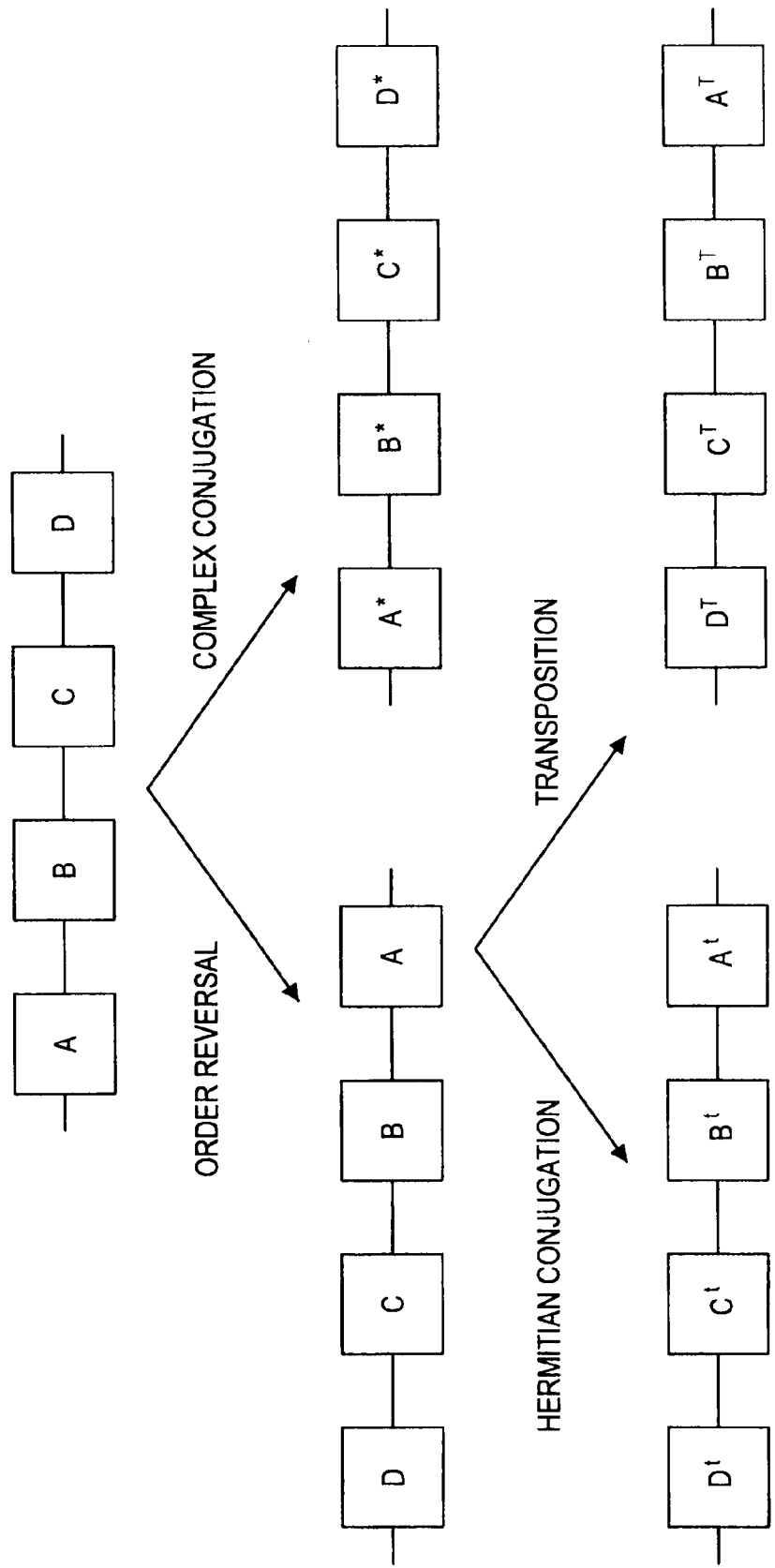
FIG. 11 is an explanatory diagram showing an example of an inverse quantum program generation method according to the embodiment.

FIG. 11 illustrates a method of complex conjugation and Hermitian conjugation for a quantum program Y having universal quantum circuits A, B, C and D arranged from left to right.

In a case of Hermitian conjugating the quantum program Y, the inverse quantum program generation unit 132 first rearranges the universal quantum circuits A, B, C and D in a reverse order and arranges the universal quantum circuits D, C, B and A from left to right. Next, the inverse quantum program generation unit 132 replaces the universal quantum circuits A, B, C and D by universal quantum circuits A†, B†, C† and D† which have been Hermitian conjugated. As a result, a quantum program Y†, which is a Hermitian conjugated quantum program Y, is obtained.

Also, in a case of complex conjugating the quantum program Y, the inverse quantum program generation unit 132 replaces the universal quantum circuits A, B, C and D forming the quantum program Y by universal quantum circuits A*, B*, C* and D* which have been complex conjugated. As a result, a quantum program Y*, which is a complex conjugated quantum program Y*, is obtained.

Additionally, a quantum program $Y^T$ which has been transposed is generated by replacing, after reversing the order of the universal quantum circuits A, B, C and D, the universal quantum circuits A, B, C and D by universal quantum circuits $A^T$, $B^T$, $C^T$ and $D^T$ which have been transposed. Each of the computation processes is completed, for a quantum program formed from p(n) universal quantum circuits, p(n) being a polynomial function, by computation performed approximately 2p(n) times.

The quantum programs CU† and R* generated by the inverse quantum program generation unit 132 in this manner are input to the connection unit 134. Additionally, the quantum program CU† is a quantum program for performing an inverse unitary operation of the quantum program CU. Also, the quantum program R* is a quantum program for performing the inverse unitary operation of the quantum program $R^T$.

(Function of Connection Unit 134)

Figure 12:
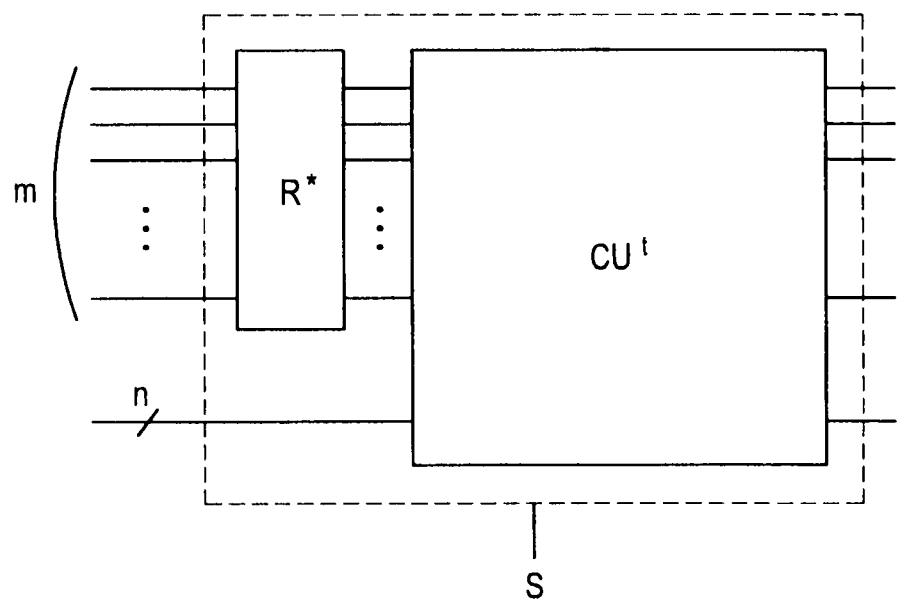
FIG. 12 is an explanatory diagram showing a connection method of an inverse quantum program according to the embodiment.

As shown in FIG. 12, the connection unit 134 generates a quantum program S by connecting the quantum programs CU† and R* generated by the inverse quantum program generation unit 132. At this time, the connection unit 134 places the quantum program R* before the quantum program CU†. Furthermore, the connection unit 134 connects the quantum program R* and the quantum program CU† such that outputs of the quantum program R* will be inputs to control registers 1 to m of the quantum program CU†. Then, the connection unit 134 outputs the quantum program S as a private key S.

Heretofore, the function of the private key generation unit 130 has been described.

As has been described, the key generation apparatus 100 outputs the quantum programs P and S described by classical information as the public key P and the private key S, respectively. As such, since the public key P is described by classical information, validity of the public key P as an encryption key is not lost even if identification is performed for the public key P. Furthermore, since the quantum program P is obfuscated by the obfuscation method according to the present embodiment, extremely high security is guaranteed against an attack using a quantum computer.

<2-2: Details of Key Generation Processing>

Figure 3:
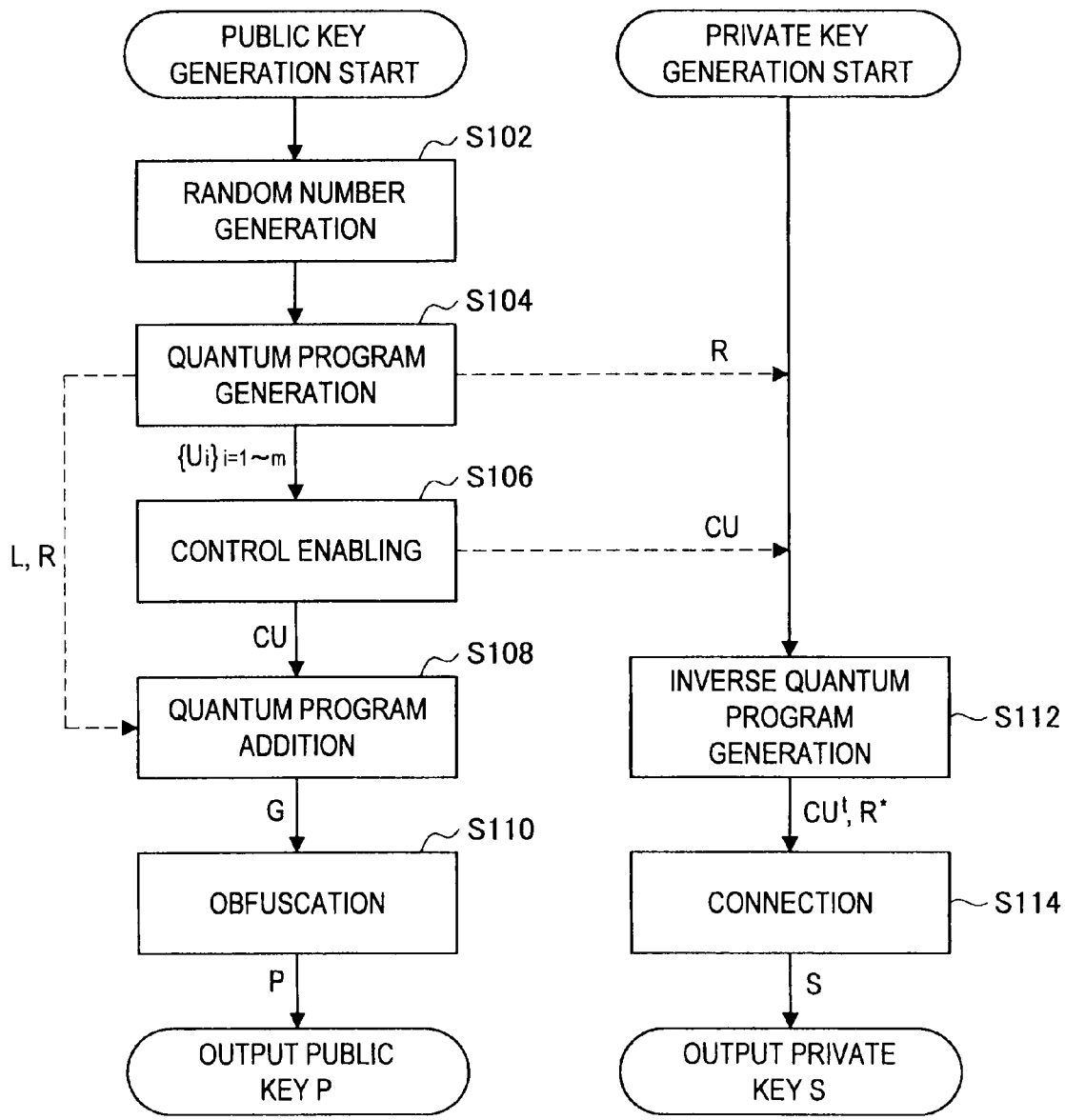
FIG. 3 is an explanatory diagram showing a flow of processing in a key generation method according to the embodiment.

Next, referring to FIG. 3, a flow of key generation processing according to the present embodiment will be described. FIG. 3 is an explanatory diagram showing a flow of key generation processing according to the present embodiment. Additionally, each processing step of the key generation processing shown in FIG. 3 is performed by the key generation apparatus 100 described above.

(2-2-1: Generation Method of Public Key P)

First, a flow of processing relating to a generation method of the public key P will be described. The processing described here is performed by the public key generation unit 110 described above.

When generation processing of a public key starts, the public key generation unit 110 first generates random numbers by the function of the random number generation unit 112 (S102). Next, the public key generation unit 110 generates, by the function of the quantum program generation unit 114, m quantum programs $U_1, \ldots, U_m$ and two quantum programs L and R by using the generated random number sequence (S104).

The m quantum programs $U_1, \ldots, U_m$ generated at step S104 are used by a process at the next step S106. Also, the quantum programs L and R generated at step S104 are used at a later step S108. Furthermore, the quantum program R generated at step S104 is used at step S112, which is a process relating to a private key generation method.

When the process proceeds to step S106, the public key generation unit 110 generates a quantum program CU which is control-enabled by the function of the control enable unit 116, by using the m quantum programs $U_1, \ldots, U_m$ generated at step S104 (S106). The quantum program CU generated at step S106 is used at the next step S108 and at step S112, which is a process relating to a private key generation method.

Next, the public key generation unit 110 generates, by the function of the quantum program addition unit 118, a quantum program G by using the quantum programs L and R generated at step S104 and the quantum program CU generated by step S106 (S108). The quantum program G generated at step S108 is used at the next step S110.

Next, the public key generation unit 110 obfuscates, by the function of the obfuscation unit 120, the quantum program G generated at step S108, and generates a quantum program P (S110). The quantum program P generated at step S110 is output as the public key P.

Heretofore, a flow of processing relating to the generation method of the public key P has been described.

(2-2-2: Generation Method of Private Key S)

Next, a flow of processing relating to a generation method of the private key S will be described. The processing described here is mainly performed by the private key generation unit 130 described above.

When generation processing of a private key starts, the private key generation unit 130 first generates, by the function of the inverse quantum program generation unit 132, quantum programs CU† and R* by using the quantum programs R and CU generated at steps S104 and S106 of the processing relating to the generation method of a public key (S112). The quantum programs CU† and R* generated at step S112 are used at the next step S114.

Next, the private key generation unit 130 connects the quantum programs CU† and R* generated at step S112 by the function of the connection unit 134, and generates a quantum program S (S114). The quantum programs S generated at step S114 is output as the private key S.

Heretofore, a flow of processing relating to the generation method of the private key S has been described.

As described above, the public key P and the private key S are respectively formed from the quantum programs P and S that can be described as the classical information. Therefore, secure certification of the public key P can be easily performed. Also, the public key P is guaranteed sufficient security against an attack by a quantum computer by the obfuscation process performed by the obfuscation unit 120 at step S110. In this manner, by adopting the key generation method according to the present embodiment, a safer and more convenient quantum public key encryption system is realised.

<3: Encryption Method>

Next, an encryption method according to the present embodiment will be described. The encryption method according to the present embodiment is performed by using the public key P generated by the key generation method described above. That is, encryption processing by the encryption method according to the present embodiment is performed by inputting, to a quantum computer, the quantum program P, which is the public key P, and a quantum state desired to be encrypted.

The encryption processing according to the present embodiment described below has a feature in that a maximally entangled state is used. Particularly, the encryption method according to the present embodiment has a feature in that it enables the ciphertext sender 20 to correctly encrypt a quantum state without knowing any information on the quantum program R, by using non-uniqueness of a basis of the maximally entangled state.

In the following, a functional configuration of the encryption apparatus 200 capable of realising such encryption method according to the present embodiment, and the encryption method will be sequentially described.

<3-1: Functional Configuration of Encryption Apparatus 200>

First, referring to FIG. 13, a functional configuration of the encryption apparatus 200 according to the present embodiment will be described. FIG. 13 is an explanatory diagram showing an example of a functional configuration of the encryption apparatus 200 according to the present embodiment. It is assumed here that the public key P (quantum program P) generated by the key generation apparatus 100 is already acquired by the encryption apparatus 200. Furthermore, it is assumed that the encryption apparatus 200 is a quantum computer or an apparatus that uses a quantum computer.

Figure 13:
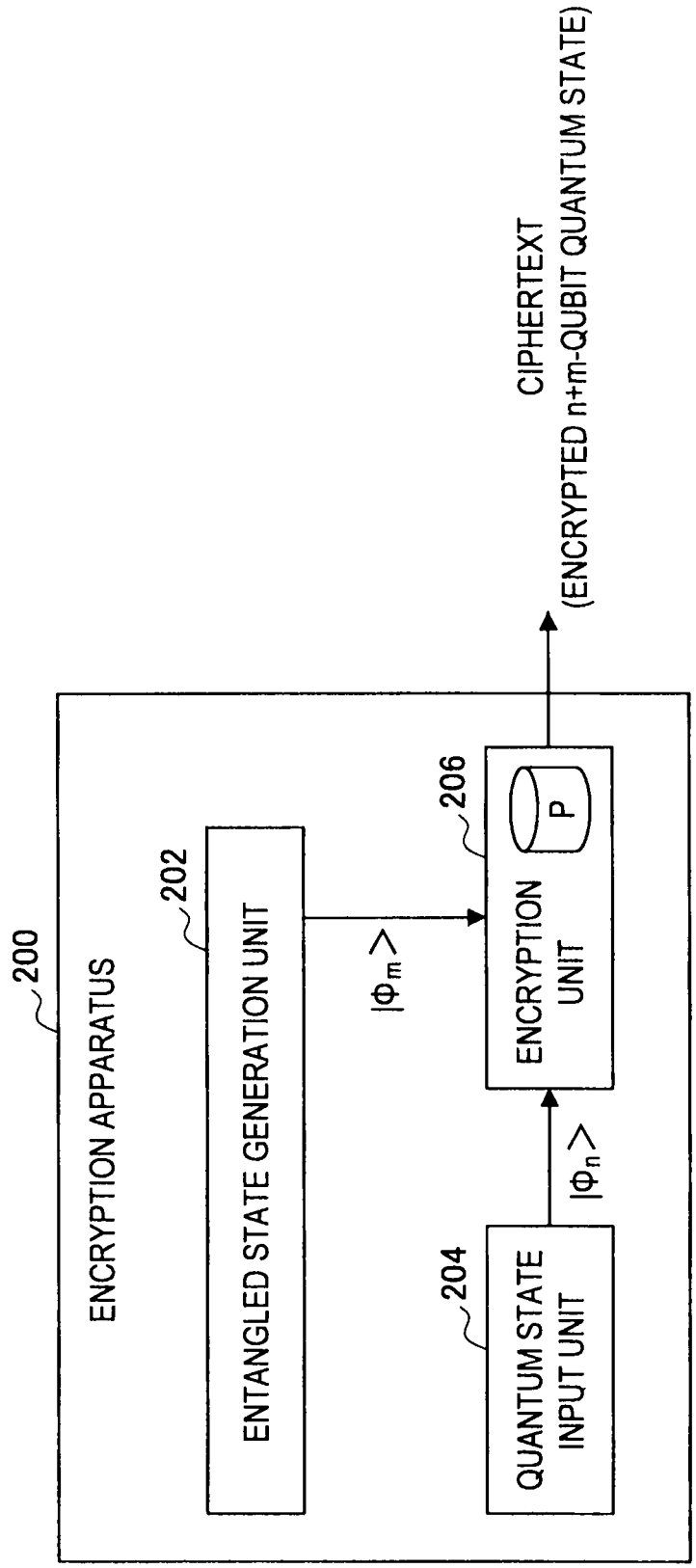
FIG. 13 is an explanatory diagram showing an example of a functional configuration of an encryption apparatus according to the embodiment.

As shown in FIG. 13, the encryption apparatus 200 is mainly configured from an entangled state generation unit 202, a quantum state input unit 204, and an encryption unit 206. Furthermore, the encryption unit 206 holds the quantum program P which is the public key P generated by the key generation apparatus 100. Additionally, it is assumed that this public key P is certified by the certificate authority 30 and is identified by the ciphertext sender 20. In the following, a function of each structural element will be described along a flow of encryption processes of a quantum state.

(Function of Entangled State Generation Unit 202)

First, the entangled state generation unit 202 generates a 2m-qubit maximally entangled state. For example, the entangled state generation unit 202 prepares a 2m-qubit basis state represented by formula (1) below. Then, the entangled state generation unit 202 performs Hadamard operation on each quantum state of first-half m qubits in the basis state in formula (1) below coupled by tensor products. When this Hadamard operation is performed, a quantum state represented by formula (2) below is generated.

Next, the entangled state generation unit 202 takes each qubit, among the quantum state represented by formula (2) below, corresponding to a result of the Hadamard operation as a control qubit, and performs controlled-NOT operation on the quantum state. A 2m-qubit maximally entangled state represented by formula (3) below is generated by this controlled-NOT operation. The maximally entangled state |Φ⟩ generated by the entangled state generation unit 202 in this manner is input to the encryption unit 206.

[Expression 1]

$$|0\rangle^{\otimes m} \otimes |0\rangle^{\otimes m} \mapsto H^{\otimes m}|0\rangle^{\otimes m} \otimes |0\rangle^{\otimes m} \tag{1}$$

$$\frac{1}{\sqrt{2^m}} \sum_{i=0}^{2^m-1} |i\rangle \otimes |0\rangle \tag{2}$$

$$|\Phi_m\rangle = \frac{1}{\sqrt{2^m}} \sum_{i=0}^{2^m-1} |i\rangle \otimes |i\rangle \tag{3}$$

Additionally, the i's appearing in formulae (1) to (3) above represent, in decimal, a bit sequence expressed in binary. For example, when considering a 2-qubit state, a binary expression |00⟩ is represented by a decimal expression |0⟩, a binary expression |01⟩ is represented by a decimal expression |1⟩, a binary expression |10⟩ is represented by a decimal expression |2⟩, and a binary expression |11⟩ is represented by a decimal expression |3⟩. Furthermore, quantum computation relating to formulae (1) to (3) above can be performed by a quantum computer using an ion trap.

(Function of Quantum State Input Unit 204)

The quantum state input unit 204 provides a function of preparing a quantum state desired to be transmitted to the ciphertext receiver 10 and inputting the quantum state to the encryption unit 206. For example, the quantum state input unit 204 encodes classical information desired to be transmitted, and generates an n-qubit quantum state $|\psi_n\rangle$ corresponding to the classical information. Or, the quantum state input unit 204 acquires the quantum state $|\psi_n\rangle$ generated outside the encryption apparatus 200. Then, the quantum state input unit 204 inputs the quantum state $|\psi_n\rangle$ that has been generated or acquired to the encryption unit 206.

(Function of Encryption Unit 206)

Figure 15:
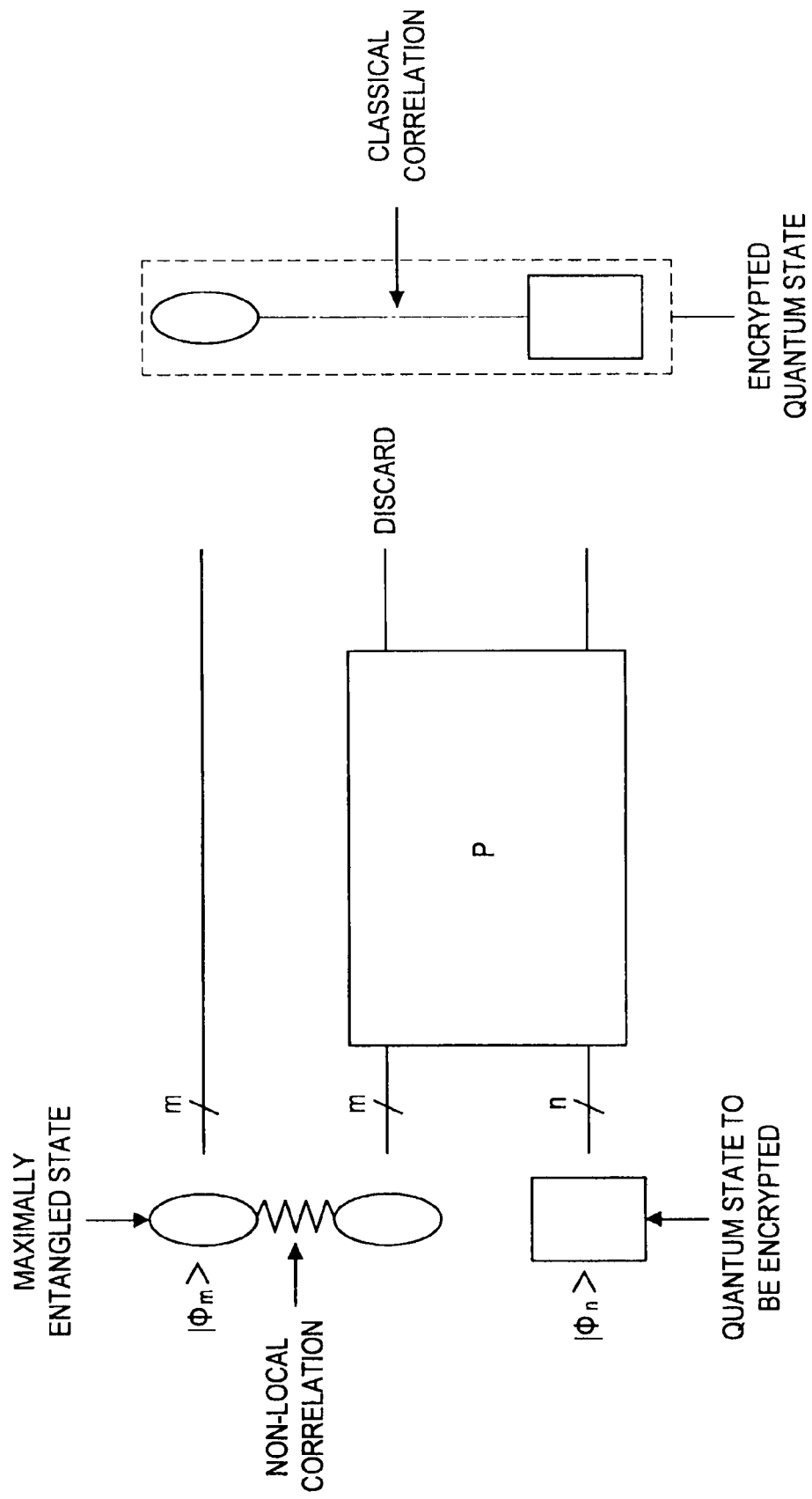
FIG. 15 is an explanatory diagram showing an example of the encryption method according to the embodiment.

The encryption unit 206 encrypts the n-qubit quantum state $|\psi_n\rangle$ input from the quantum state input unit 204 by using the quantum program P, which is the public key P. This encryption is performed by using a quantum computer and by a method as shown in FIG. 15. First, the encryption unit 206 divides the 2m-qubit maximally entangled state generated by the maximally entangled state generation unit 202 into m qubits, and holds one of them (first half) as it is.

Then, the encryption unit 206 inputs the other (second half) m-qubit quantum state to the control registers 1 to m of the quantum program P. Furthermore, the encryption unit 206 inputs the quantum state $|\psi_n\rangle$ input from the quantum state input unit 204 to the data register of the quantum program P. When execution of the quantum program P is complete, the encryption unit 206 discards the output obtained from the control registers 1 to m of the quantum program P. Then, the encryption unit 206 generates a ciphertext (encrypted quantum state) by adding, to the m-qubit quantum state that is being held, the output obtained from the data register of the quantum program P.

The ciphertext generated in this manner is represented by formula (4) below. Also, the ciphertext generated by the encryption unit 206 is transmitted from the ciphertext sender 20 to the ciphertext receiver 10 through a quantum communication channel.

[Expression 2]

$$\frac{1}{2^m}\sum_{i=0}^{2^m-1} R^T|i\rangle\langle i|R^* \otimes U_i|\psi_n\rangle\langle\psi_n|U_i^\dagger \quad (4)$$

(Non-Uniqueness of Basis of Maximally Entangled State)

A non-uniqueness of a basis of the maximally entangled state will be described here. With the quantum public key encryption system according to the present embodiment, encryption can be correctly performed without using any information on the quantum program R due to this significant property. As a result, the ciphertext receiver 10 is saved the trouble of preparing a key for encryption (public key P) including a quantum state. In the following, these points will be described.

A 2m-qubit maximally entangled state $|\Phi_m\rangle$ is represented by formula (4) above. When formula (4) above is developed by a property of a unitary operation ($R\dagger=R^T$ is established for a unitary operation R. Also, $R_{jk}=\langle j|R|k\rangle=\langle k|R^T|j\rangle$.), the maximally entangled state $|\Phi_m\rangle$ is modified as formula (5) below.

[Expression 3]

$$\begin{aligned}\frac{1}{\sqrt{2^m}}\sum_{i=0}^{2^m-1}|i\rangle\otimes|i\rangle &= \frac{1}{\sqrt{2^m}}\sum_{i=0}^{2^m-1}|i\rangle\otimes R^\dagger R|i\rangle \\ &= \frac{1}{\sqrt{2^m}}\sum_{i=0}^{2^m-1}|i\rangle\otimes\sum_{j=0}^{2^m-1}|j\rangle \\ &\quad \langle j|R^\dagger\sum_{k=0}^{2^m-1}|k\rangle\langle k|R|i\rangle \\ &= \frac{1}{\sqrt{2^m}}\sum_{i,j,k=0}^{2^m-1}|i\rangle\otimes|j\rangle R_{jk}^\dagger R_{ki} \\ &= \frac{1}{\sqrt{2^m}}\sum_{i,j,k=0}^{2^m-1}|i\rangle R_{ki}\otimes|j\rangle R_{jk}^\dagger \\ &= \frac{1}{\sqrt{2^m}}\sum_{i,j,k=0}^{2^m-1}|i\rangle R_{ik}^T\otimes|j\rangle R_{jk}^* \\ &= \frac{1}{\sqrt{2^m}}\sum_{k=0}^{2^m-1}\sum_{i=0}^{2^m-1}|i\rangle\langle i|R^T|k\rangle\otimes\sum_{j=0}^{2^m-1}|j\rangle \\ &\quad \langle j|R^\dagger|k\rangle \\ &= \frac{1}{\sqrt{2^m}}\sum_{k=0}^{2^m-1} R^T|k\rangle\otimes R^\dagger|k\rangle\end{aligned} \quad (5)$$

As is apparent from formula (5) above, a basis of the maximally entangled state $|\Phi_m\rangle$ can be transformed by using a unitary transformation R. Although the unitary transformation is represented by R to help understanding of the following description, the transformation above is realised for arbitrary unitary transformation R. This property is called the non-uniqueness of a basis of a maximally entangled state.

Next, a process of encrypting the n-qubit quantum state $|\psi_n\rangle$ by using the maximally entangled state $|\Phi_m\rangle$ represented by formula (5) above and the quantum program P will be shown as a formula. Additionally, the quantum program P is used in an obfuscated state in the quantum public key encryption system according to the present embodiment, but for the sake of simplicity, a process of encrypting the quantum state $|\psi_n\rangle$ by using the quantum program G before obfuscation will be shown here as a formula. Additionally, the quantum program P is an equivalent of the quantum program G. Therefore, the quantum states that are finally generated will be the same.

The first-half m qubits of the maximally entangled state $|\Phi_m\rangle$ are held, and the second-half m qubits are input to the control registers 1 to m of the quantum program G. Then, the unitary operation R included in the quantum program G is performed on the second-half m qubits of the maximally entangled state $|\Phi_m\rangle$. This computational operation is represented by formula (6) below.

Additionally, the maximally entangled state $|\Phi_m\rangle$ can be represented by using the unitary operation R corresponding to the quantum program R due to the non-uniqueness of the basis of the maximally entangled state represented by formula (5) above. Accordingly, the formula can be developed as formula (6) below.

Next, a result of the computational operation represented by formula (6) below is input to the control registers 1 to m of the quantum program CU. The computation by the quantum program CU is performed on the quantum state input to the control registers 1 to m and an encryption-target quantum state $|\psi_n\rangle$ to be input to a data register. This computational operation is represented by formula (7) below. Contents of the quantum program CU are to have a quantum program $U_i$ that is selected according to the input to the control register 1 to m act on the quantum state $|\psi_n\rangle$ input to the data register. Accordingly, computation by the quantum program CU is developed as shown in formula (7) below.

Next, a result of the computational operation represented by formula (7) below is input to the quantum program L. Here, among computational results of the quantum program CU, output of the control registers 1 to m is input to the quantum program L. Accordingly, output of the quantum program L is represented by formula (8) below. Furthermore, since output L|i⟩ of the quantum program L is to be discarded, a final output (density matrix shown in formula (9) below) of the quantum program G is obtained by calculating a partial trace relating to this state to be discarded.

[Expression 4]

$$(I \otimes R)\frac{1}{\sqrt{2^m}}\sum_{i=0}^{2^m-1} R^T|i\rangle \otimes R^\dagger|i\rangle = \tag{6}$$

$$\frac{1}{\sqrt{2^m}}\sum_{i=0}^{2^m-1} IR^T|i\rangle \otimes RR^\dagger|i\rangle = \frac{1}{\sqrt{2^m}}\sum_{i=0}^{2^m-1} R^T|i\rangle \otimes |i\rangle$$

$$\frac{1}{\sqrt{2^m}}\sum_{i=0}^{2^m-1} R^T|i\rangle \otimes CU(|i\rangle \otimes |\psi_n\rangle) = \frac{1}{\sqrt{2^m}}\sum_{i=0}^{2^m-1} R^T|i\rangle \otimes |i\rangle \otimes U_i|\psi_n\rangle \tag{7}$$

$$\frac{1}{\sqrt{2^m}}\sum_{i=0}^{2^m-1} R^T|i\rangle \otimes L|i\rangle \otimes U_i|\psi_n\rangle \tag{8}$$

$$\frac{1}{2^m}\sum_{i=0}^{2^m-1} R^T|i\rangle\langle i|R^* \otimes U_i|\psi_n\rangle\langle\psi_n|U_i^\dagger \tag{9}$$

What is important in the formula development above is that, due to the non-uniqueness of the basis of the maximally entangled state, the quantum state $|\psi_n\rangle$ is encrypted by using information on the unitary operation R as is developed in formula (6) above even though information on the quantum program R is not input to the quantum program P (quantum program G). In other words, the ciphertext sender 20 can cancel an effect of a unitary operation R† and perform encryption of the quantum state $|\psi_n\rangle$ without knowing any information on the quantum program R.

In this manner, by using the significant property of the maximally entangled state, a secure quantum public key encryption system where information on the quantum program R is completely hidden is realised. Additionally, it was necessary according to the quantum public key encryption system described in JP-A-2008-294666 to provide the ciphertext sender 20 with quantum information that performs transformation that cancels the quantum program R.

Therefore, the quantum public key encryption system according to the present embodiment can be said to be more secure because information for cancelling the quantum program R does not have to be given. Furthermore, due to the property described above, the quantum state does not have to be included in the key for encryption (public key P), and thus the public key P can be described by only the classical information. As a result, secure certification of the public key P in the quantum public key encryption system is enabled.

<3-2: Details of Encryption Processing>

Figure 14:
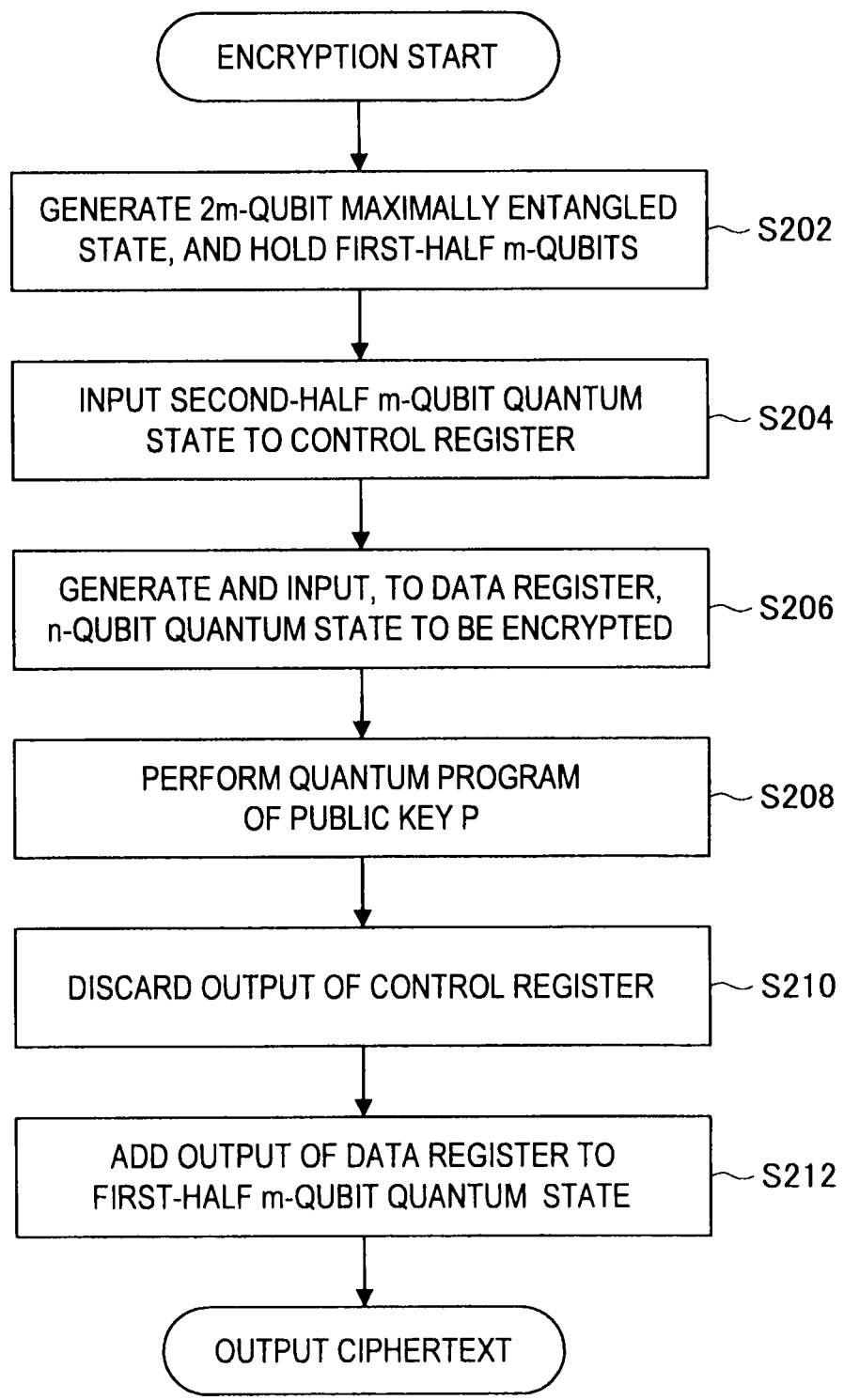
FIG. 14 is an explanatory diagram showing a flow of processing in an encryption method according to the embodiment.

Next, referring to FIG. 14, a flow of encryption processing according to the present embodiment will be described. FIG. 14 is an explanatory diagram showing a flow of the encryption processing according to the present embodiment. Additionally, each processing step of the encryption processing shown in FIG. 14 is performed by the encryption apparatus 200 described above.

When the encryption processing starts, the encryption apparatus 200 generates a 2m-qubit maximally entangled state by the function of the maximally entangled state generation unit 202, and holds a first-half m-qubit quantum state by the function of the encryption unit 206 (S202).

Next, the encryption apparatus 200 inputs a second-half m-qubit quantum state to the control registers 1 to m of the quantum program P by the function of the encryption unit 206 (S204). Then, the encryption apparatus 200 generates, by the function of the quantum state input unit 204, an n-qubit quantum state to be encrypted, and inputs the same to the data register of the quantum program P by the function of the encryption unit 206 (S206).

Next, the encryption apparatus 200 performs, by the function of the encryption unit 206, computation by the quantum program P by using the quantum state input to the control registers 1 to m and the data register (S208). Then, the encryption apparatus 200 discards the quantum state output from the control registers 1 to m of the quantum program P by the function of the encryption unit 206 (S210).

Next, the encryption apparatus 200 adds, to the first-half m-qubit quantum state that is being held, the quantum state output from the data register of the quantum program P, by the function of the encryption unit 206 (S212). Then, the encryption apparatus 200 outputs the quantum state obtained by the addition process at step S212 as a ciphertext.

Heretofore, a flow of the encryption processing according to the present embodiment has been described.

As has been described, the encryption method according to the present embodiment is for encrypting a quantum state without using information on the quantum program R, by using the non-uniqueness of the basis of the maximally entangled state. As a result, the quantum state does not have to be included in the key for encryption (public key P), and thus the public key P can be described by only the classical information. Furthermore, since information on the quantum program R is completely hidden, extremely high security is realised.

<4: Decryption Method>

Next, a decryption method according to the present embodiment will be described. The decryption method according to the present embodiment is performed by using the private key S generated by the key generation method described above. That is, decryption processing by the decryption method according to the present embodiment is performed by inputting, to a quantum computer, the quantum program S, which is the private key S, and a ciphertext (encrypted quantum state). In the following, a functional configuration of the decryption apparatus 300 capable of realising the decryption method according to the present embodiment, and the decryption method will be sequentially described.

<4-1: Functional Configuration of Decryption Apparatus 300>

Figure 16:
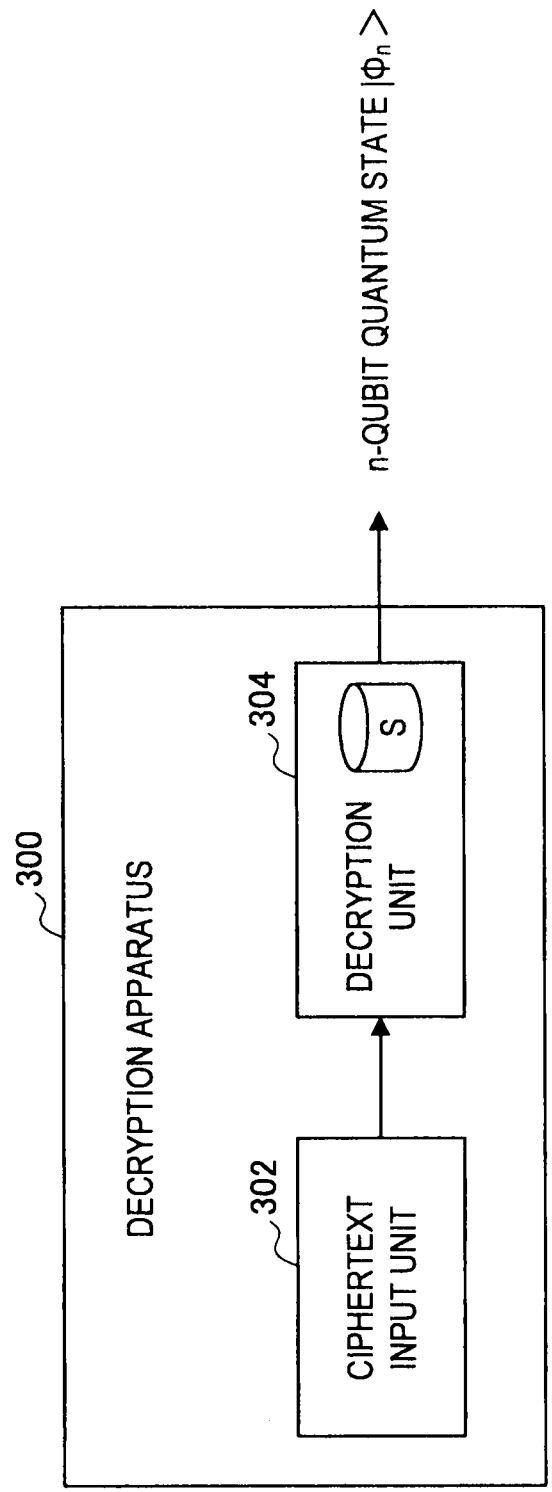
FIG. 16 is an explanatory diagram showing an example of a functional configuration of a decryption apparatus according to the embodiment.

First, referring to FIG. 16, a functional configuration of the decryption apparatus 300 according to the present embodiment will be described. FIG. 16 is an explanatory diagram showing an example of a functional configuration of the decryption apparatus 300 according to the present embodiment. It is assumed here that the private key S (quantum program S) generated by the key generation apparatus 100 is already acquired by the decryption apparatus 300. Also, it is assumed that the decryption apparatus 300 is a quantum computer or an apparatus that uses a quantum computer.

As shown in FIG. 16, the decryption apparatus 300 is mainly configured from a ciphertext input unit 302 and a decryption unit 304. Furthermore, the decryption unit 304 holds the quantum program S, which is the private key S generated by the key generation apparatus 100. In the following, a function of each structural element will be described along a flow of decryption processes of an encrypted quantum state.

(Function of Ciphertext Input Unit 302)

The ciphertext input unit 302 acquires a ciphertext (encrypted quantum state) transmitted from the ciphertext sender 20 through a quantum communication channel. Then, the ciphertext input unit 302 inputs the acquired ciphertext to the decryption unit 304.

(Function of Decryption Unit 304)

Figure 18:
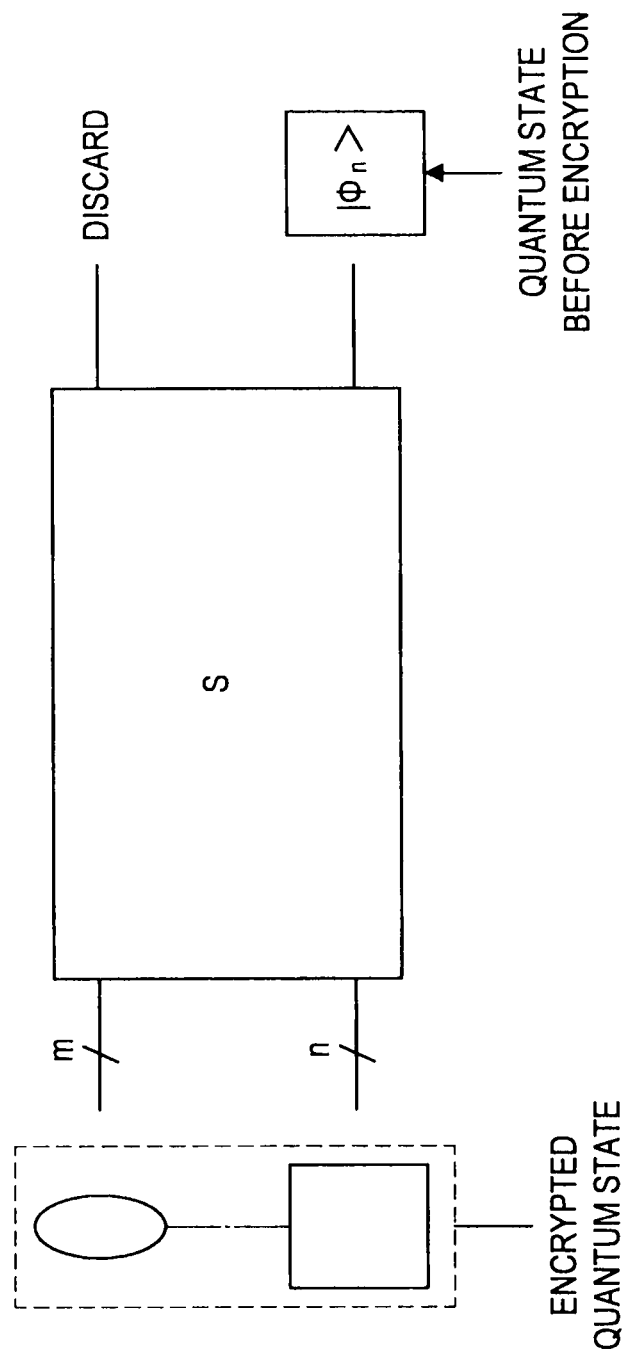
FIG. 18 is an explanatory diagram showing an example of the decryption method according to the embodiment.

The decryption unit 304 decrypts the ciphertext, which is an n+m-qubit quantum state, by using the quantum program S, which is the private key S. This decryption is performed by using a quantum computer and by a method as shown in FIG. 18. First, the decryption unit 304 inputs, to the control registers 1 to m of the quantum program S, the part of the ciphertext corresponding to the m-qubit quantum state added at the encryption apparatus 200. Also, the decryption unit 304 inputs, to the data register of the quantum program S, the quantum state output from the data register of the quantum program P at the encryption apparatus 200.

Then, the decryption unit 304 performs computation by the quantum program S by using a quantum computer. After performing the computation, the decryption unit 304 discards the quantum state output from the control registers 1 to m of the quantum program S. Furthermore, the decryption unit 304 acquires an n-qubit quantum state output from the data register of the quantum program S. This n-qubit quantum state is the quantum state $|\psi_n\rangle$ which is the quantum state before encryption. The decryption unit 304 restores the original quantum state $|\psi_n\rangle$ from the ciphertext in this manner.

(Decryption Processes)

Here, the decryption processes by the decryption unit 304 will be represented by a formula. When decryption is started, the decryption unit 304 performs, on the part of the ciphertext corresponding to the m-qubit quantum state, the quantum program R* included in the quantum program S.

This performance operation is represented by formula (10) below. Next, the decryption unit 304 inputs the output of the quantum program R* to the control registers 1 to m of the quantum program CU†, and inputs the remaining n-qubit quantum state of the ciphertext to the data register of the quantum program CU†. Then, the decryption unit 304 performs the computation by the quantum program CU†. This computational operation is represented by formula (11) below. As a result of this operation, the quantum state $|\psi_n\rangle$ before encryption is output from the data register of the quantum program CU†.

[Expression 5]

$$(R^* \otimes I)\left(\frac{1}{2^m}\sum_{i=0}^{2^m-1} R^T|i\rangle\langle i|R^* \otimes U_i|\psi_n\rangle\langle\psi_n|U_i^\dagger\right)(R^T \otimes I) = \quad (10)$$

$$\frac{1}{2^m}\sum_{i=0}^{2^m-1} |i\rangle\langle i| \otimes U_i|\psi_n\rangle\langle\psi_n|U_i^\dagger$$

$$\frac{1}{2^m}\sum_{i=0}^{2^m-1} CU^\dagger(|i\rangle\langle i| \otimes U_i|\psi_n\rangle\langle\psi_n|U_i^\dagger)CU = \quad (11)$$

$$\frac{1}{2^m}\sum_{i=0}^{2^m-1} |i\rangle\langle i| \otimes |\psi_n\rangle\langle\psi_n| = \frac{1}{2^m}I \otimes |\psi_n\rangle\langle\psi_n|$$

Heretofore, the function of the decryption apparatus 300 has been described.

<4-2: Details of Decryption Processing>

Figure 17:
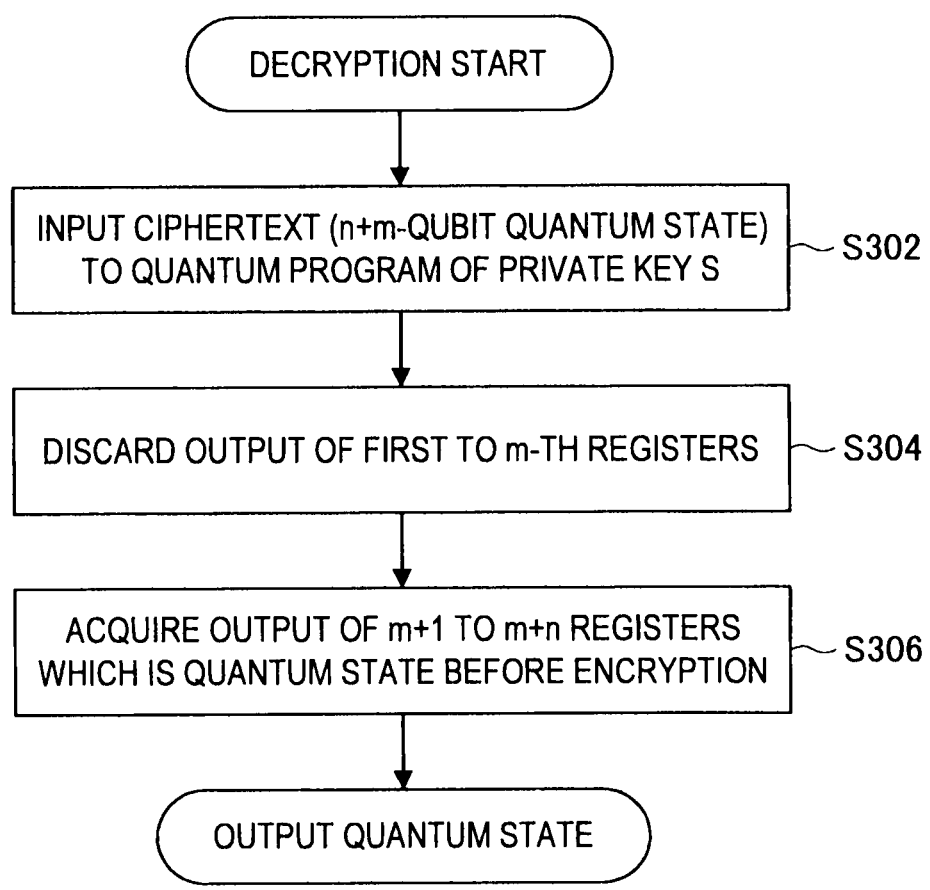
FIG. 17 is an explanatory diagram showing a flow of processing in a decryption method according to the embodiment.

Next, referring to FIG. 17, a flow of decryption processing according to the present embodiment will be described. FIG. 17 is an explanatory diagram showing a flow of the decryption processing according to the present embodiment. Additionally, each processing step of the decryption processing shown in FIG. 17 is performed by the decryption apparatus 300 described above.

When the decryption processing starts, the decryption apparatus 300 inputs a ciphertext acquired by the function of the ciphertext input unit 302 to the quantum program S by the function of the decryption unit 304 (S302). Next, the decryption apparatus 300 performs computation by the quantum program S by the function of the decryption unit 304, and discards output of the control registers 1 to m of the quantum program S (S304).

Furthermore, the decryption apparatus 300 acquires, by the function of the decryption unit 304, the quantum state $|\psi_n\rangle$ output from the data register of the quantum program S (S306). Then, the decryption apparatus 300 outputs the quantum state $|\psi_n\rangle$ acquired at step S306.

Heretofore, a flow of the decryption processing according to the present embodiment has been described.

As has been described, by adopting the decryption method according to the present embodiment, a ciphertext generated by the encryption method according to the present embodiment can be easily decoded by using the quantum program S, which is the private key S.

<5: Summary>

Lastly, technical contents according to the embodiment of the present invention will be briefly summarised.

The technology according to the present embodiment relates to a key generation method, an encryption method and a decryption method in a quantum public key cryptosystem. The technology according to the present embodiment is for encrypting a quantum state which is encoded classical information, or a quantum state as it is. Furthermore, although a quantum communication channel is used, an entity configuration of this quantum public key cryptosystem can be set to the same form as that of a classical public key cryptosystem. Accordingly, it can easily be made to match a present concept of security. Of course, a high level of security is realised, as has been described above.

Furthermore, the quantum public key encryption system according to the present embodiment performs all the encryption processing by only the operation of a quantum computer at the ciphertext sender 20. Also, the quantum public key encryption system according to the present embodiment performs all the decryption processing by only the operation of a quantum computer at the ciphertext receiver 10.

Accordingly, the quantum computer at the ciphertext sender 20 and the quantum computer at the ciphertext receiver 10 do not have to be connected by a quantum communication channel, or the quantum computers do not have to be cooperatively operated. Accordingly, convenience is extremely high compared to a quantum cryptosystem that performs processing relating to encryption/decryption between the ciphertext sender 20 and the ciphertext receiver 10.

Furthermore, encryption in the quantum public key encryption system according to the present embodiment is performed by using a certified public key and a maximally entangled state generated by the ciphertext sender 20. Therefore, it becomes possible to describe the public key by classical information. As a result, certification/non-certification of the public key can be easily verified. Since encryption is performed by using a certified public key, a quantum state can be encrypted for sure.

(Supplementary Explanation of Certification)

As described above, the quantum public key encryption system according to the present embodiment uses a public key described as classical information. Accordingly, the ciphertext sender 20 can easily verify certification/non-certification of the public key. Also, an effect of increasing security is obtained by forming the public key only by the classical information. In the following, these effects will be supplementarily described.

First, we discuss two requests for sure realisation of certification of the public key in the quantum public key encryption system. The first request is to enable easy verification, by the ciphertext sender 20, of whether a distributed public key has been certified by the certificate authority 30 or not (identification of public key). The second request is to maintain a public key in a state usable for encryption, even after the identification of the public key has been performed.

Let us consider a case here of forming the public key by a quantum state. When identification of the public key is performed, a result of the identification will be classical information. That is, some kind of measurement is performed on the quantum state by the identification. At this time, a part of the quantum state is projected onto the classical information by the measurement. As a result, it becomes difficult to use the part that is projected onto the classical information for encryption using quantum nature. On the other hand, identification is not performed for a part not projected onto the classical information. That is, there is a trade-off relationship between identification and validity as an encryption key.

This trade-off relationship is based on an issue relating to measurement of a quantum state, and is extremely difficult to solve. In that respect, the public key according to the present embodiment is described only by classical information, and the above issue relating to identification of a public key does not arise.

It should be understood by those skilled in the art that various modifications, combinations, sub-combinations and alterations may occur depending on design requirements and other factors insofar as they are within the scope of the appended claims or the equivalents thereof.

What is claimed is:

1. A quantum public key encryption system comprising:
a first quantum information processing apparatus;
a second quantum information processing apparatus connected to the first quantum information processing apparatus through a quantum communication channel; and
a certificate authority connected to the first and second quantum information processing apparatuses through a classical communication channel, wherein the first quantum information processing apparatus includes
a key generation circuit that generates a public key and a private key,
a first classical transmission circuit that transmits the public key generated by the key generation circuit to the certificate authority through the classical communication channel,
a first quantum reception circuit that receives an encrypted quantum state transmitted through the quantum communication channel from the second quantum information processing apparatus, and
a decryption circuit that restores an original quantum state from the encrypted quantum state received by the first quantum reception circuit, by using the private key generated by the key generation circuit,
wherein the certificate authority includes
a first classical reception circuit that receives the public key transmitted through the classical communication channel from the first quantum information processing apparatus,
a certificate circuit that certifies the public key received by the first classical reception circuit, and
a second classical transmission circuit that transmits the public key certified by the certificate circuit to the second quantum information processing apparatus through the classical communication channel, and
wherein the second quantum information processing apparatus includes
a second classical reception circuit that receives the public key transmitted through the classical communication channel from the certificate circuit,
an encryption circuit that encrypts a quantum state by using the public key received by the second classical reception circuit, and
a quantum transmission circuit that transmits the quantum state encrypted by the encryption circuit to the first quantum information processing apparatus through the quantum communication channel.

* * * * *